(12) United States Patent
Haider et al.

(10) Patent No.: US 11,706,029 B2
(45) Date of Patent: *Jul. 18, 2023

(54) SECURE AND ZERO KNOWLEDGE DATA SHARING FOR CLOUD APPLICATIONS

(71) Applicant: Masimo Corporation, Irvine, CA (US)

(72) Inventors: Amer Haider, Saratoga, CA (US); Ali Ahmed, Saratoga, CA (US)

(73) Assignee: Masimo Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/500,805

(22) Filed: Oct. 13, 2021

(65) Prior Publication Data

US 2022/0191031 A1 Jun. 16, 2022

Related U.S. Application Data

(63) Continuation of application No. 16/834,641, filed on Mar. 30, 2020, now Pat. No. 11,153,089, which is a
(Continued)

(51) Int. Cl.
*H04L 9/32* (2006.01)
*H04L 9/08* (2006.01)
(Continued)

(52) U.S. Cl.
CPC .......... *H04L 9/3221* (2013.01); *G06F 16/951* (2019.01); *G06F 21/14* (2013.01);
(Continued)

(58) Field of Classification Search
CPC ....... H04L 9/3221; H04L 9/14; H04L 9/0825; H04L 63/0428; H04L 63/06; H04L 67/10;
(Continued)

(56) References Cited

U.S. PATENT DOCUMENTS 4,960,128 A 10/1990 Gordon et al.
4,964,408 A 10/1990 Hink et al.
(Continued)

FOREIGN PATENT DOCUMENTS

WO WO 2018/009612 1/2018

OTHER PUBLICATIONS

US 2022/0192529 A1, 06/2022, Al-Ali et al. (withdrawn)
(Continued)

*Primary Examiner* — Hosuk Song
(74) *Attorney, Agent, or Firm* — Knobbe, Martens, Olson & Bear, LLP

(57) ABSTRACT

Disclosed is a zero-knowledge distributed application configured to securely share information among groups of users having various roles, such as doctors and patients. Confidential information may be encrypted client-side, with private keys that reside solely client side. Encrypted collections of data may be uploaded to, and hosted by, a server that does not have access to keys suitable to decrypt the data. Other users may retrieve encrypted data from the server and decrypt some or all of the data with keys suitable to gain access to at least part of the encrypted data. The system includes a key hierarchy with multiple entry points to a top layer by which access is selectively granted to various users and keys may be recovered.

15 Claims, 5 Drawing Sheets

Related U.S. Application Data continuation of application No. 15/642,632, filed on Jul. 6, 2017, now Pat. No. 10,608,817.

(60) Provisional application No. 62/358,783, filed on Jul. 6, 2016.

(51) Int. Cl.

| | | |
|---|---|---|
| *H04L 9/14* | (2006.01) | |
| *G06F 21/62* | (2013.01) | |
| *H04L 9/40* | (2022.01) | |
| *G06F 16/951* | (2019.01) | |
| *G06F 21/14* | (2013.01) | |
| *H04L 67/10* | (2022.01) | |

(52) U.S. Cl.
CPC ...... *G06F 21/6218* (2013.01); *G06F 21/6227* (2013.01); *H04L 9/0825* (2013.01); *H04L 9/14* (2013.01); *H04L 63/0428* (2013.01); *H04L 63/06* (2013.01); *H04L 67/10* (2013.01); *H04L 2463/062* (2013.01)

(58) Field of Classification Search
CPC ........... H04L 2463/062; G06F 21/6218; G06F 21/6227; G06F 16/951; G06F 21/14
See application file for complete search history.

(56) References Cited

U.S. PATENT DOCUMENTS

| | | |
|---|---|---|
| 5,319,355 A | 6/1994 | Russek |
| 5,337,744 A | 8/1994 | Branigan |
| 5,341,805 A | 8/1994 | Stavridi et al. |
| D353,195 S | 12/1994 | Savage et al. |
| D353,196 S | 12/1994 | Savage et al. |
| 5,377,676 A | 1/1995 | Vari et al. |
| D359,546 S | 6/1995 | Savage et al. |
| 5,431,170 A | 7/1995 | Mathews |
| 5,436,499 A | 7/1995 | Namavar et al. |
| D361,840 S | 8/1995 | Savage et al. |
| D362,063 S | 9/1995 | Savage et al. |
| D363,120 S | 10/1995 | Savage et al. |
| 5,456,252 A | 10/1995 | Vari et al. |
| 5,479,934 A | 1/1996 | Imran |
| 5,482,036 A | 1/1996 | Diab et al. |
| 5,494,043 A | 2/1996 | O'Sullivan et al. |
| 5,533,511 A | 7/1996 | Kaspari et al. |
| 5,561,275 A | 10/1996 | Savage et al. |
| 5,590,649 A | 1/1997 | Caro et al. |
| 5,602,924 A | 2/1997 | Durand et al. |
| 5,638,816 A | 6/1997 | Kiani-Azarbayjany et al. |
| 5,638,818 A | 6/1997 | Diab et al. |
| 5,645,440 A | 7/1997 | Tobler et al. |
| 5,671,914 A | 9/1997 | Kalkhoran et al. |
| 5,726,440 A | 3/1998 | Kalkhoran et al. |
| D393,830 S | 4/1998 | Tobler et al. |
| 5,743,262 A | 4/1998 | Lepper, Jr. et al. |
| 5,747,806 A | 5/1998 | Khalil et al. |
| 5,750,994 A | 5/1998 | Schlager |
| 5,758,644 A | 6/1998 | Diab et al. |
| 5,760,910 A | 6/1998 | Lepper, Jr. et al. |
| 5,890,929 A | 4/1999 | Mills et al. |
| 5,919,134 A | 7/1999 | Diab |
| 5,987,343 A | 11/1999 | Kinast |
| 5,997,343 A | 12/1999 | Mills et al. |
| 6,002,952 A | 12/1999 | Diab et al. |
| 6,010,937 A | 1/2000 | Karam et al. |
| 6,027,452 A | 2/2000 | Flaherty et al. |
| 6,040,578 A | 3/2000 | Malin et al. |
| 6,066,204 A | 5/2000 | Haven |
| 6,115,673 A | 9/2000 | Malin et al. |
| 6,124,597 A | 9/2000 | Shehada et al. |
| 6,128,521 A | 10/2000 | Marro et al. |
| 6,129,675 A | 10/2000 | Jay |
| 6,144,868 A | 11/2000 | Parker |
| 6,152,754 A | 11/2000 | Gerhardt et al. |
| 6,184,521 B1 | 2/2001 | Coffin, IV et al. |
| 6,232,609 B1 | 5/2001 | Snyder et al. |
| 6,241,683 B1 | 6/2001 | Macklem et al. |
| 6,255,708 B1 | 7/2001 | Sudharsanan et al. |
| 6,280,381 B1 | 8/2001 | Malin et al. |
| 6,285,896 B1 | 9/2001 | Tobler et al. |
| 6,308,089 B1 | 10/2001 | von der Ruhr et al. |
| 6,317,627 B1 | 11/2001 | Ennen et al. |
| 6,321,100 B1 | 11/2001 | Parker |
| 6,334,065 B1 | 12/2001 | Al-Ali et al. |
| 6,360,114 B1 | 3/2002 | Diab et al. |
| 6,368,283 B1 | 4/2002 | Xu et al. |
| 6,411,373 B1 | 6/2002 | Garside et al. |
| 6,415,167 B1 | 7/2002 | Blank et al. |
| 6,430,437 B1 | 8/2002 | Marro |
| 6,430,525 B1 | 8/2002 | Weber et al. |
| 6,463,311 B1 | 10/2002 | Diab |
| 6,470,199 B1 | 10/2002 | Kopotic et al. |
| 6,487,429 B2 | 11/2002 | Hockersmith et al. |
| 6,505,059 B1 | 1/2003 | Kollias et al. |
| 6,525,386 B1 | 2/2003 | Mills et al. |
| 6,526,300 B1 | 2/2003 | Kiani et al. |
| 6,534,012 B1 | 3/2003 | Hazen et al. |
| 6,542,764 B1 | 4/2003 | Al-Ali et al. |
| 6,580,086 B1 | 6/2003 | Schulz et al. |
| 6,584,336 B1 | 6/2003 | Ali et al. |
| 6,587,196 B1 | 7/2003 | Stippick et al. |
| 6,587,199 B1 | 7/2003 | Luu |
| 6,595,316 B2 | 7/2003 | Cybulski et al. |
| 6,597,932 B2 | 7/2003 | Tian et al. |
| 6,606,511 B1 | 8/2003 | Ali et al. |
| 6,635,559 B2 | 10/2003 | Greenwald et al. |
| 6,639,668 B1 | 10/2003 | Trepagnier |
| 6,640,116 B2 | 10/2003 | Diab |
| 6,640,117 B2 | 10/2003 | Makarewicz et al. |
| 6,658,276 B2 | 12/2003 | Kiani et al. |
| 6,661,161 B1 | 12/2003 | Lanzo et al. |
| 6,697,656 B1 | 2/2004 | Al-Ali |
| 6,697,658 B2 | 2/2004 | Al-Ali |
| RE38,476 E | 3/2004 | Diab et al. |
| RE38,492 E | 4/2004 | Diab et al. |
| 6,738,652 B2 | 5/2004 | Mattu et al. |
| 6,754,820 B1 | 6/2004 | Scheidt et al. |
| 6,760,607 B2 | 7/2004 | Al-Ali |
| 6,788,965 B2 | 9/2004 | Ruchti et al. |
| 6,816,241 B2 | 11/2004 | Grubisic |
| 6,822,564 B2 | 11/2004 | Al-Ali |
| 6,850,787 B2 | 2/2005 | Weber et al. |
| 6,850,788 B2 | 2/2005 | Al-Ali |
| 6,876,931 B2 | 4/2005 | Lorenz et al. |
| 6,920,345 B2 | 7/2005 | Al-Ali et al. |
| 6,934,570 B2 | 8/2005 | Kiani et al. |
| 6,943,348 B1 | 9/2005 | Coffin IV |
| 6,956,649 B2 | 10/2005 | Acosta et al. |
| 6,961,598 B2 | 11/2005 | Diab |
| 6,970,792 B1 | 11/2005 | Diab |
| 6,985,764 B2 | 1/2006 | Mason et al. |
| 6,990,364 B2 | 1/2006 | Ruchti et al. |
| 6,998,247 B2 | 2/2006 | Monfre et al. |
| 7,003,338 B2 | 2/2006 | Weber et al. |
| 7,015,451 B2 | 3/2006 | Dalke et al. |
| 7,027,849 B2 | 4/2006 | Al-Ali |
| D526,719 S | 8/2006 | Richie, Jr. et al. |
| 7,096,052 B2 | 8/2006 | Mason et al. |
| 7,096,054 B2 | 8/2006 | Abdul-Hafiz et al. |
| D529,616 S | 10/2006 | Deros et al. |
| 7,120,797 B2 * | 10/2006 | Wheeler ............... H04L 63/065 713/176 |
| 7,133,710 B2 | 11/2006 | Acosta et al. |
| 7,142,901 B2 | 11/2006 | Kiani et al. |
| 7,219,227 B2 * | 5/2007 | Hori .......... G06F 21/10 713/193 |
| 7,225,006 B2 | 5/2007 | Al-Ali et al. |
| RE39,672 E | 6/2007 | Shehada et al. |
| 7,254,429 B2 | 8/2007 | Schurman et al. |
| 7,254,431 B2 | 8/2007 | Al-Ali et al. |
| 7,254,434 B2 | 8/2007 | Schulz et al. |
| 7,274,955 B2 | 9/2007 | Kiani et al. |

(56) References Cited

U.S. PATENT DOCUMENTS

| | | | |
|---|---|---|---|
| D554,263 S | 10/2007 | Al-Ali et al. | |
| 7,280,858 B2 | 10/2007 | Al-Ali et al. | |
| 7,289,835 B2 | 10/2007 | Mansfield et al. | |
| 7,292,883 B2 | 11/2007 | De Felice et al. | |
| 7,341,559 B2 | 3/2008 | Schulz et al. | |
| 7,343,186 B2 | 3/2008 | Lamego et al. | |
| D566,282 S | 4/2008 | Al-Ali et al. | |
| 7,356,365 B2 | 4/2008 | Schurman | |
| 7,371,981 B2 | 5/2008 | Abdul-Hafiz | |
| 7,373,193 B2 | 5/2008 | Al-Ali et al. | |
| 7,377,794 B2 | 5/2008 | Al-Ali et al. | |
| 7,395,158 B2 | 7/2008 | Monfre et al. | |
| 7,415,297 B2 | 8/2008 | Al-Ali et al. | |
| 7,438,683 B2 | 10/2008 | Al-Ali et al. | |
| 7,483,729 B2 | 1/2009 | Al-Ali et al. | |
| D587,657 S | 3/2009 | Al-Ali et al. | |
| 7,500,950 B2 | 3/2009 | Al-Ali et al. | |
| 7,509,494 B2 | 3/2009 | Al-Ali | |
| 7,510,849 B2 | 3/2009 | Schurman et al. | |
| 7,514,725 B2 | 4/2009 | Wojtczuk et al. | |
| 7,519,406 B2 | 4/2009 | Blank et al. | |
| D592,507 S | 5/2009 | Wachman et al. | |
| 7,530,942 B1 | 5/2009 | Diab | |
| 7,593,230 B2 | 9/2009 | Abul-Haj et al. | |
| 7,596,398 B2 | 9/2009 | Al-Ali et al. | |
| 7,606,608 B2 | 10/2009 | Blank et al. | |
| 7,620,674 B2 | 11/2009 | Ruchti et al. | |
| D606,659 S | 12/2009 | Kiani et al. | |
| 7,629,039 B2 | 12/2009 | Eckerbom et al. | |
| 7,640,140 B2 | 12/2009 | Ruchti et al. | |
| 7,647,083 B2 | 1/2010 | Al-Ali et al. | |
| D609,193 S | 2/2010 | Al-Ali et al. | |
| D614,305 S | 4/2010 | Al-Ali et al. | |
| 7,697,966 B2 | 4/2010 | Monfre et al. | |
| 7,698,105 B2 | 4/2010 | Ruchti et al. | |
| RE41,317 E | 5/2010 | Parker | |
| RE41,333 E | 5/2010 | Blank et al. | |
| 7,720,227 B2 | 5/2010 | Kaji et al. | |
| 7,729,733 B2 | 6/2010 | Al-Ali et al. | |
| 7,761,127 B2 | 7/2010 | Al-Ali et al. | |
| 7,764,982 B2 | 7/2010 | Dalke et al. | |
| D621,516 S | 8/2010 | Kiani et al. | |
| 7,791,155 B2 | 9/2010 | Diab | |
| RE41,912 E | 11/2010 | Parker | |
| 7,880,626 B2 | 2/2011 | Al-Ali et al. | |
| 7,909,772 B2 | 3/2011 | Popov et al. | |
| 7,919,713 B2 | 4/2011 | Al-Ali et al. | |
| 7,937,128 B2 | 5/2011 | Al-Ali | |
| 7,937,129 B2 | 5/2011 | Mason et al. | |
| 7,941,199 B2 | 5/2011 | Kiani | |
| 7,957,780 B2 | 6/2011 | Lamego et al. | |
| 7,962,188 B2 | 6/2011 | Kiani et al. | |
| 7,976,472 B2 | 7/2011 | Kiani | |
| 7,990,382 B2 | 8/2011 | Kiani | |
| 8,008,088 B2 | 8/2011 | Bellott et al. | |
| RE42,753 E | 9/2011 | Kiani-Azarbayjany et al. | |
| 8,028,701 B2 | 10/2011 | Al-Ali et al. | |
| 8,048,040 B2 | 11/2011 | Kiani | |
| 8,050,728 B2 | 11/2011 | Al-Ali et al. | |
| RE43,169 E | 2/2012 | Parker | |
| 8,118,620 B2 | 2/2012 | Al-Ali et al. | |
| 8,130,105 B2 | 3/2012 | Al-Ali et al. | |
| 8,182,443 B1 | 5/2012 | Kiani | |
| 8,190,223 B2 | 5/2012 | Al-Ali et al. | |
| 8,203,438 B2 | 6/2012 | Kiani et al. | |
| 8,203,704 B2 | 6/2012 | Merritt et al. | |
| 8,219,172 B2 | 7/2012 | Schurman et al. | |
| 8,224,411 B2 | 7/2012 | Al-Ali et al. | |
| 8,229,532 B2 | 7/2012 | Davis | |
| 8,233,627 B2 * | 7/2012 | Tanaka | H04L 9/0825 380/278 |
| 8,233,955 B2 | 7/2012 | Al-Ali et al. | |
| 8,255,026 B1 | 8/2012 | Al-Ali | |
| 8,265,723 B1 | 9/2012 | McHale et al. | |
| 8,274,360 B2 | 9/2012 | Sampath et al. | |
| 8,280,473 B2 | 10/2012 | Al-Ali | |
| 8,315,683 B2 | 11/2012 | Al-Ali et al. | |
| RE43,860 E | 12/2012 | Parker | |
| 8,346,330 B2 | 1/2013 | Lamego | |
| 8,353,842 B2 | 1/2013 | Al-Ali et al. | |
| 8,355,766 B2 | 1/2013 | MacNeish, III et al. | |
| 8,364,967 B2 * | 1/2013 | Sudia | H04L 9/085 713/180 |
| 8,374,665 B2 | 2/2013 | Lamego | |
| 8,388,353 B2 | 3/2013 | Kiani et al. | |
| 8,401,602 B2 | 3/2013 | Kiani | |
| 8,414,499 B2 | 4/2013 | Al-Ali et al. | |
| 8,418,524 B2 | 4/2013 | Al-Ali | |
| 8,428,967 B2 | 4/2013 | Olsen et al. | |
| 8,430,817 B1 | 4/2013 | Al-Ali et al. | |
| 8,437,825 B2 | 5/2013 | Dalvi et al. | |
| 8,455,290 B2 | 6/2013 | Siskavich | |
| 8,457,707 B2 | 6/2013 | Kiani | |
| 8,471,713 B2 | 6/2013 | Poeze et al. | |
| 8,473,020 B2 | 6/2013 | Kiani et al. | |
| 8,509,867 B2 | 8/2013 | Workman et al. | |
| 8,515,509 B2 | 8/2013 | Bruinsma et al. | |
| 8,523,781 B2 | 9/2013 | Al-Ali | |
| D692,145 S | 10/2013 | Al-Ali et al. | |
| 8,571,617 B2 | 10/2013 | Reichgott et al. | |
| 8,571,618 B1 | 10/2013 | Lamego et al. | |
| 8,571,619 B2 | 10/2013 | Al-Ali et al. | |
| 8,577,431 B2 | 11/2013 | Lamego et al. | |
| 8,584,345 B2 | 11/2013 | Al-Ali et al. | |
| 8,588,880 B2 | 11/2013 | Abdul-Hafiz et al. | |
| 8,630,691 B2 | 1/2014 | Lamego et al. | |
| 8,641,631 B2 | 2/2014 | Sierra et al. | |
| 8,652,060 B2 | 2/2014 | Al-Ali | |
| 8,666,468 B1 | 3/2014 | Al-Ali | |
| 8,670,811 B2 | 3/2014 | O'Reilly | |
| 8,677,148 B2 | 3/2014 | O'Hare et al. | |
| RE44,823 E | 4/2014 | Parker | |
| RE44,875 E | 4/2014 | Kiani et al. | |
| 8,688,183 B2 | 4/2014 | Bruinsma et al. | |
| 8,690,799 B2 | 4/2014 | Telfort et al. | |
| 8,702,627 B2 | 4/2014 | Telfort et al. | |
| 8,712,494 B1 | 4/2014 | MacNeish, III et al. | |
| 8,715,206 B2 | 5/2014 | Telfort et al. | |
| 8,723,677 B1 | 5/2014 | Kiani | |
| 8,732,481 B2 | 5/2014 | Balinsky et al. | |
| 8,740,792 B1 | 6/2014 | Kiani et al. | |
| 8,755,535 B2 | 6/2014 | Telfort et al. | |
| 8,755,872 B1 | 6/2014 | Marinow | |
| 8,764,671 B2 | 7/2014 | Kiani | |
| 8,767,964 B2 | 7/2014 | Bae et al. | |
| 8,768,423 B2 | 7/2014 | Shakespeare et al. | |
| 8,771,204 B2 | 7/2014 | Telfort et al. | |
| 8,781,544 B2 | 7/2014 | Al-Ali et al. | |
| 8,790,268 B2 | 7/2014 | Al-Ali | |
| 8,801,613 B2 | 8/2014 | Al-Ali et al. | |
| 8,821,397 B2 | 9/2014 | Al-Ali et al. | |
| 8,821,415 B2 | 9/2014 | Al-Ali et al. | |
| 8,830,449 B1 | 9/2014 | Lamego et al. | |
| 8,840,549 B2 | 9/2014 | Al-Ali et al. | |
| 8,852,094 B2 | 10/2014 | Al-Ali et al. | |
| 8,852,994 B2 | 10/2014 | Wojtczuk et al. | |
| 8,874,915 B1 | 10/2014 | Rodoper et al. | |
| 8,886,936 B2 | 11/2014 | Nonaka et al. | |
| 8,897,847 B2 | 11/2014 | Al-Ali | |
| 8,911,377 B2 | 12/2014 | Al-Ali | |
| 8,913,749 B2 * | 12/2014 | Miyazawa | H04W 12/033 380/270 |
| 8,935,528 B2 * | 1/2015 | Hsu | G06F 21/31 713/168 |
| 8,983,071 B2 | 3/2015 | Han et al. | |
| 8,989,831 B2 | 3/2015 | Al-Ali et al. | |
| 8,998,809 B2 | 4/2015 | Kiani | |
| 9,066,666 B2 | 6/2015 | Kiani | |
| 9,066,680 B1 | 6/2015 | Al-Ali et al. | |
| 9,095,316 B2 | 8/2015 | Welch et al. | |
| 9,106,038 B2 | 8/2015 | Telfort et al. | |
| 9,107,625 B2 | 8/2015 | Telfort et al. | |
| 9,131,881 B2 | 9/2015 | Diab et al. | |
| 9,135,608 B2 | 9/2015 | Herlitz | |

(56) References Cited

U.S. PATENT DOCUMENTS

| | | |
|---|---|---|
| 9,138,180 B1 | 9/2015 | Coverston et al. |
| 9,153,112 B1 | 10/2015 | Kiani et al. |
| 9,192,329 B2 | 11/2015 | Al-Ali |
| 9,192,351 B1 | 11/2015 | Telfort et al. |
| 9,195,385 B2 | 11/2015 | Al-Ali et al. |
| 9,211,095 B1 | 12/2015 | Al-Ali |
| 9,218,454 B2 | 12/2015 | Kiani et al. |
| 9,245,668 B1 | 1/2016 | Vo et al. |
| 9,267,572 B2 | 2/2016 | Barker et al. |
| 9,277,880 B2 | 3/2016 | Poeze et al. |
| 9,307,928 B1 | 4/2016 | Al-Ali et al. |
| 9,323,894 B2 | 4/2016 | Kiani |
| D755,392 S | 5/2016 | Hwang et al. |
| 9,326,712 B1 | 5/2016 | Kiani |
| 9,392,945 B2 | 7/2016 | Al-Ali et al. |
| 9,408,542 B1 | 8/2016 | Kinast et al. |
| 9,436,645 B2 | 9/2016 | Al-Ali et al. |
| 9,445,759 B1 | 9/2016 | Lamego et al. |
| 9,474,474 B2 | 10/2016 | Lamego et al. |
| 9,480,435 B2 | 11/2016 | Olsen |
| 9,510,779 B2 | 12/2016 | Poeze et al. |
| 9,517,024 B2 | 12/2016 | Kiani et al. |
| 9,532,722 B2 | 1/2017 | Lamego et al. |
| 9,544,151 B2 | 1/2017 | Gross |
| 9,560,996 B2 | 2/2017 | Kiani |
| 9,579,039 B2 | 2/2017 | Jansen et al. |
| 9,622,692 B2 | 4/2017 | Lamego et al. |
| D788,312 S | 5/2017 | Al-Ali et al. |
| 9,649,054 B2 | 5/2017 | Lamego et al. |
| 9,697,928 B2 | 7/2017 | Al-Ali et al. |
| 9,717,458 B2 | 8/2017 | Lamego et al. |
| 9,724,016 B1 | 8/2017 | Al-Ali et al. |
| 9,724,024 B2 | 8/2017 | Al-Ali |
| 9,724,025 B1 | 8/2017 | Kiani et al. |
| 9,749,232 B2 | 8/2017 | Sampath et al. |
| 9,750,442 B2 | 9/2017 | Olsen |
| 9,750,461 B1 | 9/2017 | Telfort |
| 9,775,545 B2 | 10/2017 | Al-Ali et al. |
| 9,778,079 B1 | 10/2017 | Al-Ali et al. |
| 9,782,077 B2 | 10/2017 | Lamego et al. |
| 9,787,568 B2 | 10/2017 | Lamego et al. |
| 9,808,188 B1 | 11/2017 | Perea et al. |
| 9,839,379 B2 | 12/2017 | Al-Ali et al. |
| 9,839,381 B1 | 12/2017 | Weber et al. |
| 9,847,749 B2 | 12/2017 | Kiani et al. |
| 9,848,800 B1 | 12/2017 | Lee et al. |
| 9,861,298 B2 | 1/2018 | Eckerbom et al. |
| 9,861,305 B1 | 1/2018 | Weber et al. |
| 9,877,650 B2 | 1/2018 | Muhsin et al. |
| 9,891,079 B2 | 2/2018 | Dalvi |
| 9,924,897 B1 | 3/2018 | Abdul-Hafiz |
| 9,936,917 B2 | 4/2018 | Poeze et al. |
| 9,955,937 B2 | 5/2018 | Telfort |
| 9,965,946 B2 | 5/2018 | Al-Ali et al. |
| D820,865 S | 6/2018 | Muhsin et al. |
| 9,986,952 B2 | 6/2018 | Dalvi et al. |
| 9,998,280 B2 | 6/2018 | Nix |
| D822,215 S | 7/2018 | Al-Ali et al. |
| D822,216 S | 7/2018 | Barker et al. |
| 10,010,276 B2 | 7/2018 | Al-Ali et al. |
| 10,086,138 B1 | 10/2018 | Novak, Jr. |
| 10,111,591 B2 | 10/2018 | Dyell et al. |
| D833,624 S | 11/2018 | DeJong et al. |
| 10,123,729 B2 | 11/2018 | Dyell et al. |
| D835,282 S | 12/2018 | Barker et al. |
| D835,283 S | 12/2018 | Barker et al. |
| D835,284 S | 12/2018 | Barker et al. |
| D835,285 S | 12/2018 | Barker et al. |
| 10,148,438 B2 | 12/2018 | Evancich et al. |
| 10,149,616 B2 | 12/2018 | Al-Ali et al. |
| 10,154,815 B2 | 12/2018 | Al-Ali et al. |
| 10,159,412 B2 | 12/2018 | Lamego et al. |
| 10,188,348 B2 | 1/2019 | Al-Ali et al. |
| RE47,218 E | 2/2019 | Al-Ali |
| RE47,244 E | 2/2019 | Kiani et al. |
| RE47,249 E | 2/2019 | Kiani et al. |
| 10,205,291 B2 | 2/2019 | Scruggs et al. |
| 10,226,187 B2 | 3/2019 | Al-Ali et al. |
| 10,231,657 B2 | 3/2019 | Al-Ali et al. |
| 10,231,670 B2 | 3/2019 | Blank et al. |
| RE47,353 E | 4/2019 | Kiani et al. |
| 10,279,247 B2 | 5/2019 | Kiani |
| 10,292,664 B2 | 5/2019 | Al-Ali |
| 10,299,720 B2 | 5/2019 | Brown et al. |
| 10,327,337 B2 | 6/2019 | Schmidt et al. |
| 10,327,713 B2 | 6/2019 | Barker et al. |
| 10,332,630 B2 | 6/2019 | Al-Ali |
| 10,383,520 B2 | 8/2019 | Wojtczuk et al. |
| 10,383,527 B2 | 8/2019 | Al-Ali |
| 10,388,120 B2 | 8/2019 | Muhsin et al. |
| D864,120 S | 10/2019 | Forrest et al. |
| 10,441,181 B1 | 10/2019 | Telfort et al. |
| 10,441,196 B2 | 10/2019 | Eckerbom et al. |
| 10,448,844 B2 | 10/2019 | Al-Ali et al. |
| 10,448,871 B2 | 10/2019 | Al-Ali et al. |
| 10,456,038 B2 | 10/2019 | Lamego et al. |
| 10,463,340 B2 | 11/2019 | Telfort et al. |
| 10,471,159 B1 | 11/2019 | Lapotko et al. |
| 10,505,311 B2 | 12/2019 | Al-Ali et al. |
| 10,524,738 B2 | 1/2020 | Olsen |
| 10,530,811 B2 | 1/2020 | Black et al. |
| 10,532,174 B2 | 1/2020 | Al-Ali |
| 10,537,285 B2 | 1/2020 | Shreim et al. |
| 10,542,903 B2 | 1/2020 | Al-Ali et al. |
| 10,555,678 B2 | 2/2020 | Dalvi et al. |
| 10,568,553 B2 | 2/2020 | O'Neil et al. |
| RE47,882 E | 3/2020 | Al-Ali |
| 10,608,817 B2 | 3/2020 | Haider et al. |
| D880,477 S | 4/2020 | Forrest et al. |
| 10,617,302 B2 | 4/2020 | Al-Ali et al. |
| 10,617,335 B2 | 4/2020 | Al-Ali et al. |
| 10,637,181 B2 | 4/2020 | Al-Ali et al. |
| D886,849 S | 6/2020 | Muhsin et al. |
| D887,548 S | 6/2020 | Abdul-Hafiz et al. |
| D887,549 S | 6/2020 | Abdul-Hafiz et al. |
| 10,667,764 B2 | 6/2020 | Ahmed et al. |
| D890,708 S | 7/2020 | Forrest et al. |
| 10,721,785 B2 | 7/2020 | Al-Ali |
| 10,736,518 B2 | 8/2020 | Al-Ali et al. |
| 10,750,984 B2 | 8/2020 | Pauley et al. |
| D897,098 S | 9/2020 | Al-Ali |
| 10,779,098 B2 | 9/2020 | Iswanto et al. |
| 10,827,961 B1 | 11/2020 | Iyengar et al. |
| 10,828,007 B1 | 11/2020 | Telfort et al. |
| 10,832,818 B2 | 11/2020 | Muhsin et al. |
| 10,849,554 B2 | 12/2020 | Shreim et al. |
| 10,856,750 B2 | 12/2020 | Indorf |
| D906,970 S | 1/2021 | Forrest et al. |
| D908,213 S | 1/2021 | Abdul-Hafiz et al. |
| 10,918,281 B2 | 2/2021 | Al-Ali et al. |
| 10,932,705 B2 | 3/2021 | Muhsin et al. |
| 10,932,729 B2 | 3/2021 | Kiani et al. |
| 10,939,878 B2 | 3/2021 | Kiani et al. |
| 10,956,950 B2 | 3/2021 | Al-Ali et al. |
| D916,135 S | 4/2021 | Indorf et al. |
| D917,046 S | 4/2021 | Abdul-Hafiz et al. |
| D917,550 S | 4/2021 | Indorf et al. |
| D917,564 S | 4/2021 | Indorf et al. |
| D917,704 S | 4/2021 | Al-Ali et al. |
| 10,987,066 B2 | 4/2021 | Chandran et al. |
| 10,991,135 B2 | 4/2021 | Al-Ali et al. |
| D919,094 S | 5/2021 | Al-Ali et al. |
| D919,100 S | 5/2021 | Al-Ali et al. |
| 11,006,867 B2 | 5/2021 | Al-Ali |
| D921,202 S | 6/2021 | Al-Ali et al. |
| 11,024,064 B2 | 6/2021 | Muhsin et al. |
| 11,026,604 B2 | 6/2021 | Chen et al. |
| D925,597 S | 7/2021 | Chandran et al. |
| D927,699 S | 8/2021 | Al-Ali et al. |
| 11,076,777 B2 | 8/2021 | Lee et al. |
| 11,114,188 B2 | 9/2021 | Poeze et al. |
| D933,232 S | 10/2021 | Al-Ali et al. |
| D933,233 S | 10/2021 | Al-Ali et al. |
| D933,234 S | 10/2021 | Al-Ali et al. |

(56) References Cited

U.S. PATENT DOCUMENTS

| | | |
|---|---|---|
| 11,145,408 B2 | 10/2021 | Sampath et al. |
| 11,147,518 B1 | 10/2021 | Al-Ali et al. |
| 11,153,089 B2 * | 10/2021 | Haider ................... H04L 9/14 |
| 11,185,262 B2 | 11/2021 | Al-Ali et al. |
| 11,191,484 B2 | 12/2021 | Kiani et al. |
| D946,596 S | 3/2022 | Ahmed |
| D946,597 S | 3/2022 | Ahmed |
| D946,598 S | 3/2022 | Ahmed |
| D946,617 S | 3/2022 | Ahmed |
| 11,272,839 B2 | 3/2022 | Al-Ali et al. |
| 11,289,199 B2 | 3/2022 | Al-Ali |
| RE49,034 E | 4/2022 | Al-Ali |
| 11,298,021 B2 | 4/2022 | Muhsin et al. |
| D950,580 S | 5/2022 | Ahmed |
| D950,599 S | 5/2022 | Ahmed |
| D950,738 S | 5/2022 | Al-Ali et al. |
| D957,648 S | 7/2022 | Al-Ali |
| 11,389,093 B2 | 7/2022 | Triman et al. |
| 11,406,286 B2 | 8/2022 | Al-Ali et al. |
| 11,417,426 B2 | 8/2022 | Muhsin et al. |
| 11,439,329 B2 | 9/2022 | Lamego |
| 11,445,948 B2 | 9/2022 | Scruggs et al. |
| D965,789 S | 10/2022 | Al-Ali et al. |
| D967,433 S | 10/2022 | Al-Ali et al. |
| 11,464,410 B2 | 10/2022 | Muhsin |
| 11,504,058 B1 | 11/2022 | Sharma et al. |
| 11,504,066 B1 | 11/2022 | Dalvi et al. |
| D971,933 S | 12/2022 | Ahmed |
| D973,072 S | 12/2022 | Ahmed |
| D973,685 S | 12/2022 | Ahmed |
| D973,686 S | 12/2022 | Ahmed |
| D974,193 S | 1/2023 | Forrest et al. |
| 2001/0034477 A1 | 10/2001 | Mansfield et al. |
| 2001/0039483 A1 | 11/2001 | Brand et al. |
| 2002/0010401 A1 | 1/2002 | Bushmakin et al. |
| 2002/0058864 A1 | 5/2002 | Mansfield et al. |
| 2002/0133080 A1 | 9/2002 | Apruzzese et al. |
| 2003/0013975 A1 | 1/2003 | Kiani |
| 2003/0018243 A1 | 1/2003 | Gerhardt et al. |
| 2003/0144582 A1 | 7/2003 | Cohen et al. |
| 2003/0156288 A1 | 8/2003 | Barnum et al. |
| 2003/0212312 A1 | 11/2003 | Coffin, IV et al. |
| 2004/0106163 A1 | 6/2004 | Workman, Jr. et al. |
| 2005/0055276 A1 | 3/2005 | Kiani et al. |
| 2005/0234317 A1 | 10/2005 | Kiani |
| 2006/0073719 A1 | 4/2006 | Kiani |
| 2006/0189871 A1 | 8/2006 | Al-Ali et al. |
| 2007/0073116 A1 | 3/2007 | Kiani et al. |
| 2007/0160202 A1 | 7/2007 | Wilt et al. |
| 2007/0180140 A1 | 8/2007 | Welch et al. |
| 2007/0244377 A1 | 10/2007 | Cozad et al. |
| 2008/0064965 A1 | 3/2008 | Jay et al. |
| 2008/0094228 A1 | 4/2008 | Welch et al. |
| 2008/0221418 A1 | 9/2008 | Al-Ali et al. |
| 2009/0036759 A1 | 2/2009 | Ault et al. |
| 2009/0041249 A1 | 2/2009 | Tanaka et al. |
| 2009/0093687 A1 | 4/2009 | Telfort et al. |
| 2009/0095926 A1 | 4/2009 | MacNeish, III |
| 2009/0247984 A1 | 10/2009 | Lamego et al. |
| 2009/0275813 A1 | 11/2009 | Davis |
| 2009/0327746 A1 | 12/2009 | Greco et al. |
| 2010/0004518 A1 | 1/2010 | Vo et al. |
| 2010/0030040 A1 | 2/2010 | Poeze et al. |
| 2010/0099964 A1 | 4/2010 | O'Reilly et al. |
| 2010/0234718 A1 | 9/2010 | Sampath et al. |
| 2010/0270257 A1 | 10/2010 | Wachman et al. |
| 2011/0028806 A1 | 2/2011 | Merritt et al. |
| 2011/0028809 A1 | 2/2011 | Goodman |
| 2011/0040197 A1 | 2/2011 | Welch et al. |
| 2011/0082711 A1 | 4/2011 | Poeze et al. |
| 2011/0087081 A1 | 4/2011 | Kiani et al. |
| 2011/0118561 A1 | 5/2011 | Tari et al. |
| 2011/0137297 A1 | 6/2011 | Kiani et al. |
| 2011/0172498 A1 | 7/2011 | Olsen et al. |
| 2011/0230733 A1 | 9/2011 | Al-Ali |
| 2012/0123231 A1 | 5/2012 | O'Reilly |
| 2012/0165629 A1 | 6/2012 | Merritt et al. |
| 2012/0209084 A1 | 8/2012 | Olsen et al. |
| 2012/0226117 A1 | 9/2012 | Lamego et al. |
| 2012/0283524 A1 | 11/2012 | Kiani et al. |
| 2012/0321088 A1 | 12/2012 | Braun et al. |
| 2013/0023775 A1 | 1/2013 | Lamego et al. |
| 2013/0041591 A1 | 2/2013 | Lamego |
| 2013/0060147 A1 | 3/2013 | Welch et al. |
| 2013/0096405 A1 | 4/2013 | Garfio |
| 2013/0296672 A1 | 11/2013 | O'Neil et al. |
| 2013/0345921 A1 | 12/2013 | Al-Ali et al. |
| 2014/0166076 A1 | 6/2014 | Kiani et al. |
| 2014/0180160 A1 | 6/2014 | Brown et al. |
| 2014/0187973 A1 | 7/2014 | Brown et al. |
| 2014/0275871 A1 | 9/2014 | Lamego et al. |
| 2014/0275872 A1 | 9/2014 | Merritt et al. |
| 2014/0316217 A1 | 10/2014 | Purdon et al. |
| 2014/0316218 A1 | 10/2014 | Purdon et al. |
| 2014/0323897 A1 | 10/2014 | Brown et al. |
| 2014/0323898 A1 | 10/2014 | Purdon et al. |
| 2015/0005600 A1 | 1/2015 | Blank et al. |
| 2015/0011907 A1 | 1/2015 | Purdon et al. |
| 2015/0073241 A1 | 3/2015 | Lamego |
| 2015/0080754 A1 | 3/2015 | Purdon et al. |
| 2015/0099950 A1 | 4/2015 | Al-Ali et al. |
| 2015/0106121 A1 | 4/2015 | Muhsin et al. |
| 2015/0149772 A1 | 5/2015 | Leavy et al. |
| 2015/0248568 A1 | 9/2015 | Offenberg et al. |
| 2016/0196388 A1 | 7/2016 | Lamego |
| 2016/0367173 A1 | 12/2016 | Dalvi et al. |
| 2017/0024748 A1 | 1/2017 | Haider |
| 2017/0042488 A1 | 2/2017 | Muhsin |
| 2017/0173632 A1 | 6/2017 | Al-Ali |
| 2017/0251974 A1 | 9/2017 | Shreim et al. |
| 2017/0311891 A1 | 11/2017 | Kiani et al. |
| 2018/0103874 A1 | 4/2018 | Lee et al. |
| 2018/0242926 A1 | 8/2018 | Muhsin et al. |
| 2018/0247353 A1 | 8/2018 | Al-Ali et al. |
| 2018/0247712 A1 | 8/2018 | Muhsin et al. |
| 2018/0256087 A1 | 9/2018 | Al-Ali et al. |
| 2018/0296161 A1 | 10/2018 | Shreim et al. |
| 2018/0300919 A1 | 10/2018 | Muhsin et al. |
| 2018/0310822 A1 | 11/2018 | Indorf et al. |
| 2018/0310823 A1 | 11/2018 | Al-Ali et al. |
| 2018/0317826 A1 | 11/2018 | Muhsin et al. |
| 2019/0015023 A1 | 1/2019 | Monfre |
| 2019/0117070 A1 | 4/2019 | Muhsin et al. |
| 2019/0200941 A1 | 7/2019 | Chandran et al. |
| 2019/0239787 A1 | 8/2019 | Pauley et al. |
| 2019/0320906 A1 | 10/2019 | Olsen |
| 2019/0374139 A1 | 12/2019 | Kiani et al. |
| 2019/0374173 A1 | 12/2019 | Kiani et al. |
| 2019/0374713 A1 | 12/2019 | Kiani et al. |
| 2020/0060869 A1 | 2/2020 | Telfort et al. |
| 2020/0111552 A1 | 4/2020 | Ahmed |
| 2020/0113435 A1 | 4/2020 | Muhsin |
| 2020/0113488 A1 | 4/2020 | Al-Ali et al. |
| 2020/0113496 A1 | 4/2020 | Scruggs et al. |
| 2020/0113497 A1 | 4/2020 | Triman et al. |
| 2020/0113520 A1 | 4/2020 | Abdul-Hafiz et al. |
| 2020/0138288 A1 | 5/2020 | Al-Ali et al. |
| 2020/0138368 A1 | 5/2020 | Kiani et al. |
| 2020/0163597 A1 | 5/2020 | Dalvi et al. |
| 2020/0196877 A1 | 6/2020 | Vo et al. |
| 2020/0253474 A1 | 8/2020 | Muhsin et al. |
| 2020/0253544 A1 | 8/2020 | Belur Nagaraj et al. |
| 2020/0275841 A1 | 9/2020 | Telfort et al. |
| 2020/0288983 A1 | 9/2020 | Telfort et al. |
| 2020/0321793 A1 | 10/2020 | Al-Ali et al. |
| 2020/0329983 A1 | 10/2020 | Al-Ali et al. |
| 2020/0329984 A1 | 10/2020 | Al-Ali et al. |
| 2020/0329993 A1 | 10/2020 | Al-Ali et al. |
| 2020/0330037 A1 | 10/2020 | Al-Ali et al. |
| 2021/0022628 A1 | 1/2021 | Telfort et al. |
| 2021/0104173 A1 | 4/2021 | Pauley et al. |
| 2021/0113121 A1 | 4/2021 | Diab et al. |
| 2021/0117525 A1 | 4/2021 | Kiani et al. |
| 2021/0118581 A1 | 4/2021 | Kiani et al. |

(56) References Cited

U.S. PATENT DOCUMENTS

| | | |
|---|---|---|
| 2021/0121582 A1 | 4/2021 | Krishnamani et al. |
| 2021/0161465 A1 | 6/2021 | Barker et al. |
| 2021/0236729 A1 | 8/2021 | Kiani et al. |
| 2021/0256267 A1 | 8/2021 | Ranasinghe et al. |
| 2021/0256835 A1 | 8/2021 | Ranasinghe et al. |
| 2021/0275101 A1 | 9/2021 | Vo et al. |
| 2021/0290060 A1 | 9/2021 | Ahmed |
| 2021/0290072 A1 | 9/2021 | Forrest |
| 2021/0290080 A1 | 9/2021 | Ahmed |
| 2021/0290120 A1 | 9/2021 | Al-Ali |
| 2021/0290177 A1 | 9/2021 | Novak, Jr. |
| 2021/0290184 A1 | 9/2021 | Ahmed |
| 2021/0296008 A1 | 9/2021 | Novak, Jr. |
| 2021/0330228 A1 | 10/2021 | Olsen et al. |
| 2021/0386382 A1 | 12/2021 | Olsen et al. |
| 2021/0402110 A1 | 12/2021 | Pauley et al. |
| 2022/0026355 A1 | 1/2022 | Normand et al. |
| 2022/0039707 A1 | 2/2022 | Sharma et al. |
| 2022/0053892 A1 | 2/2022 | Al-Ali et al. |
| 2022/0071562 A1 | 3/2022 | Kiani |
| 2022/0096603 A1 | 3/2022 | Kiani et al. |
| 2022/0151521 A1 | 5/2022 | Krishnamani et al. |
| 2022/0218244 A1 | 7/2022 | Kiani et al. |
| 2022/0287574 A1 | 9/2022 | Telfort et al. |
| 2022/0296161 A1 | 9/2022 | Al-Ali et al. |
| 2022/0361819 A1 | 11/2022 | Al-Ali et al. |
| 2022/0379059 A1 | 12/2022 | Yu et al. |
| 2022/0392610 A1 | 12/2022 | Kiani et al. |

OTHER PUBLICATIONS

International Search Report and Written Opinion received in PCT Application No. PCT/US2017/040832, dated Oct. 19, 2017 in 12 pages.

\* cited by examiner

SECURE AND ZERO KNOWLEDGE DATA SHARING FOR CLOUD APPLICATIONS

CROSS-REFERENCE TO RELATED APPLICATIONS

The present patent filing claims the benefit of U.S. Provisional Patent Application 62/358,783, titled SECURE AND ZERO KNOWLEDGE DATA SHARING FOR CLOUD APPLICATIONS, filed 6 Jul. 2016, the contents of which are hereby incorporated by reference.

BACKGROUND

Field

This disclosure relates to sharing encrypted data between multiple users of a system.

Description of the Related Art

A wide range of industries, including in healthcare systems, need to secure and selectively grant access to and share digital user information. Storage and transmission of sensitive user information, such as private medical information, in unsecured places or unprotected channels creates a risk of exposing the transmitted information to electronic eavesdropping. Specifically, in the case of personal health information (PHI) there are many laws and regulations that regulate the sharing of PHI and the authorization of data sharing between healthcare providers (HCPs), patients, and their families. These laws and regulations add massive security, administration, cost, or liability burdens on HCPs for maintaining, protecting, and sharing PHI. Today HCPs cannot easily share digital information with patients without complying with burdensome electronic medical records' (EMR) requirements, records which have a poor enrollment rate with patients. This is the one of the reasons why many patients still receive paper printouts after a doctor visit.

Cryptographic systems are often used to preserve the privacy of information. Cryptographic systems encrypt data to render the data incomprehensible by all but the intended users. For instance, a plain text message is often encrypted into cipher text using one of several encryption algorithms that transforms the message by use of a cryptographic key. The key is often a sequence of high entropy data generated in a way that makes the sequence computationally infeasible to guess. Access to the key can compromise the security of the cipher text, particularly when the encryption algorithm is also known. It is therefore of great importance to protect the key from unwanted access by third parties.

There are two commonly used classes of cryptographic algorithms: symmetric key algorithms and asymmetric key algorithms. Symmetric key algorithms typically use an identical key for both encrypting and decrypting and asymmetric key algorithms typically use different keys for encrypting and decrypting. One form of asymmetric key algorithms are those used in public key infrastructure (PKI).

Communication is not the only risk posed in a security system. Storage of the key in an unsecured fashion poses risks even if the storage medium, such as a memory in a server, is considered to be in a safe space (e.g. protected by a firewall). A particular problem, for instance, is insider attack at a server by an unauthorized employee. This is especially true if the key is used in a symmetric key encryption algorithm. There is therefore a need for comprehensive security coverage for data stored at a server and at a client and not just in transit between the server and client.

This need for securing data and its encryption keys, though, often is balanced against the need for usability. In many existing systems, there is an imbalance in encrypted messaging systems that makes those systems unsuitable and unfeasible for facilitating real-time patient-doctor conversations and the sending of patient education, mobile alerts, and reminders. For instance, users are often required to first enroll in an EMR patient portal to receive secure messages and digital information. This is burdensome for patients leading to poor enrollment. Furthermore if the HCPs want to send any information that is not in the EMR they cannot do so electronically. Moreover, if patients need to share data they have received from their HCP via an EMR there is presently no manner to easily and securely share the data with family, friends, or another HCP.

Today most systems use the cloud to store data. Typically the data stored in cloud is either not encrypted or encrypted using server side encryption keys. The challenge with such systems is the data encryption is not in control of the user, but instead completely dependent on the cloud provider. This technique poses a very big problem because user's data is not in their control. Users are completely at the mercy of the security and controls in place by the cloud provider. For example, a person can save their personal medical record in the cloud server and have full control over their data by keeping the encryption keys to themselves. The challenge is to share the data with others without the cloud providing gaining access to the data. This zero knowledge by the cloud protects the cloud provider from liability and process hacks and gives ownership to the user. The vulnerability of data leakage from cloud providers is a huge source of liability and issues to users.

SUMMARY OF THE INVENTION

The following is a non-exhaustive listing of some aspects of the present techniques. These and other aspects are described in the following disclosure.

Some embodiments encode data and keys in multiple layers of encryption with multiple entry points to some of the layers. In some embodiments, public key encryption may be used to encrypt messages for a particular recipient without having that recipient's private key. And in some cases, dual keys may secure patient data in some layers, with one key being derived from a user password and another key being derived from a challenge question for the user to be used when the users forgets their password. The different layers of encryption may be used to segment access to data and provide alternate entry points to underlying data by encrypting lower-level keys in higher levels of the layered encryption.

Data shared from a sender, for example an HCP, may be sent to a receiver, for example a patient, using encryption. The received, encrypted data may be then decrypted by the receiver's decryption key derived from the receiver's credentials, which are only known by the receiver. The receiver may add their own data to the original data sent by the HCP. The data with PHI may be encrypted using the receiver's encryption key and shared with the server for storage. The receiver also may make an encrypted copy of the data for sharing. This shared copy may be stored on the server with a unique and novel encryption key storage hierarchy that allows users or groups of users to access the encrypted data without changing it. To make any changes to the receiver's data, shared recipients may send an encrypted message to the receiver who must accept the changes before the update is reflected in the encrypted shared copy. In this entire process the server and the cloud provider may not have access to the encrypted data. The data encryption keys may not be shared with the cloud provider, which cannot access the data. The zero knowledge of data in the server and cloud enables user control without being at the mercy or vulnerable to the best practices by a cloud provider.

BRIEF DESCRIPTION OF THE DRAWINGS

The above-mentioned aspects and other aspects of the present techniques will be better understood when the present application is read in view of the following figures in which like numbers indicate similar or identical elements.

DETAILED DESCRIPTION OF THE PREFERRED EMBODIMENT

To mitigate the problems described herein, the inventors had to both invent solutions and, in some cases just as importantly, recognize problems overlooked (or not yet foreseen) by others in the field of cryptography and health informatics. Indeed, the inventors wish to emphasize the difficulty of recognizing those problems that are nascent, span disciplines in cryptography and health informatics, and will become much more apparent in the future should trends in industry continue as the inventors expect. Further, because multiple problems are addressed, it should be understood that some embodiments are problem-specific, and not all embodiments address every problem with traditional systems described herein or provide every benefit described herein.

Some embodiments may exchange messages between patient computing devices and doctor computing devices with a security protocol that is robust to server-side attacks. In some implementations, messages (e.g., medical advice and links to the same from the doctor, patient questions, or self-reporting of medical status) may be encrypted with keys that reside client-side, in some cases, with the keys being withheld from the server. This form of communication may be considered "zero knowledge." Use of the term "zero knowledge" herein, though, only requires that at least part of the system be "zero knowledge," e.g., some keys may be stored server-side for some aspects, while other keys are exclusively held by client devices for other portions of the data in some embodiments. Secure key distribution can be challenging when keys are withheld from a central authority. But such systems are expected to be relatively robust to attack, as the entity operating the server may not be able to decrypt the messages, m some implementations.

The secure exchange and storage of information may enable the patients to learn more about their medical procedures, prepare them for a medical procedure, and engage the patients in the process of providing healthcare (e.g., feedback may be provided by a patient regarding actual performance of checklists generated by a medical doctor). In order to provide these benefits, a number of technical problems are addressed by the embodiments below.

Figure 1:
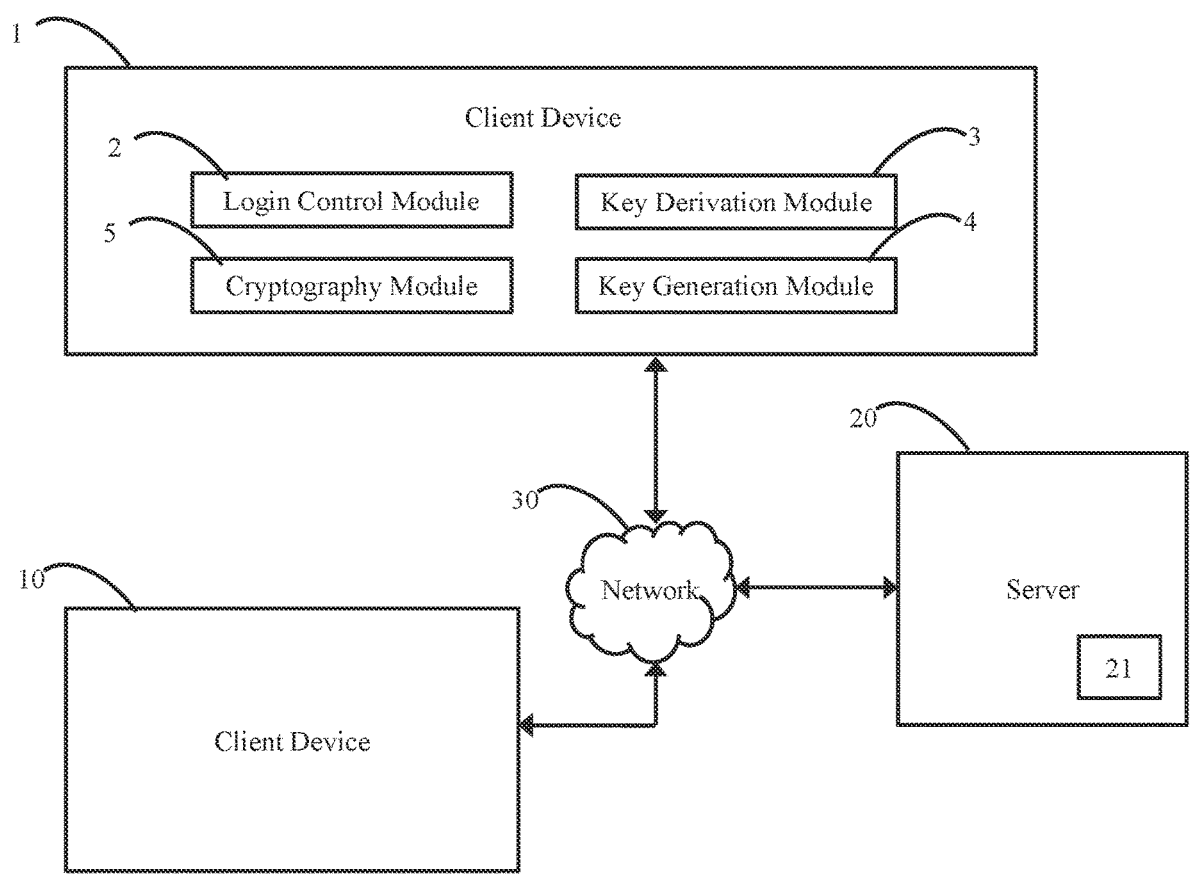
FIG. 1 is a block diagram depicting the logical architecture of a secure, distributed application for exchanging and storing medical data, according to some embodiments.

FIG. 1 depicts a computing environment that, in embodiments, may securely store and communicate user data (e.g., medical information) between a doctor and a patient. User data may be encrypted by a client computing device I of the patient (e.g., one type of user), and the encrypted user data may be stored in a server device 20, while the keys remain with the client device I and are withheld from the server. In some embodiments, user data may be created by the doctor on a different client device IO and shared with the patient client device I in the form of alerts, reminders, and instructions.

FIG. 1 shows an example of a secure system for communicating private medical information between client computing devices (e.g. a doctor or a patient's mobile computing device) through a server 20 over a network 30. Examples of the various devices may be implemented with the types of computer systems described below with reference to FIG. 2. Two client devices are shown, but commercially relevant use cases are expected to be substantially more expansive, typically including more than 1,000, and in many cases more than 10,000 user devices.

As illustrated in FIG. 1, the server device 20 may be communicatively connected to the client devices (e.g. client devices 1 and 10) via the Internet, and in some cases, various other networks, like short message service (SMS), and electronic mail (email). A provider device, which may be another client device, such as client device 10, may have a substantially similar architecture to client device 1.

The two client devices 1 and 10 may engage in peer-to-peer communication in the sense that data is only unencrypted on the client devices, even if that data is stored on the server 20. Or in some embodiments, server 20 may not store the data, e.g., peer-to-peer application layer protocols like WebRTC may pass the data directly between the client devices 1 and 10 following a handshake protocol facilitated by server 20.

Some embodiments may selectively provide access to the encrypted data when, e.g., a user loses their password, or a party should only be granted access to some of the data. A client device may implement a key hierarchy structure (KHS) to resolve these issues, as described below. The device may operate in the capacity of a server but preferably as a client in a server-client network environment or as a peer machine in a peer-to-peer networked environment.

In some embodiments, server device 20 may include a web server 21 for managing a web site, including a plurality of hierarchical web pages, and may be capable of providing the client devices with medical information. The client devices may be provided with browser software that fetches and analyzes hypertext markup language (HTML) data for rendering user screens to present medical information of the user at client device 1. The HTML data can include software code written in script languages such as ActionScript™ and JavaScript™. In certain embodiments, client device 1 may include a web browser capable of rendering web pages of a medical service web site fetched from server device 20. Client device 1 may also be capable of rendering useable screens for guiding the patient through a registration, login, learn, engage, and prepare process.

In these or other embodiments, application software (app) stored on a memory of server device 20 may be delivered to client device 1 in response to a delivery request. Alternatively or additionally, client device 1 may download the app from an app store hosted by a third-party server. The application software may be launched in accordance with the client's operation on client device 1 and may be executed on a platform implemented on the client device, such as an Apple™ operating system (iOS), Android™ OS, etc. Client device 1 may therefore, in some embodiments, include support for the medical application software downloaded from server device 20.

The user patient may enter an instruction for causing the application to proceed through login and interaction with medical information to and from server 20 using an input interface (e.g. a touch screen) of client device 1. Server device 20 may provide the medical application executed on client device 1 with various data such that the user can learn and be prepared and engaged throughout a process led by a doctor or provider. Additionally, server device 20 may provide various data to client device 1 of each patient, thereby managing the progression of the patient through a viewing of different types of data. When the medical application software is executed, for example, data designated by the application may be displayed on a screen of client device 1.

Thus, server device 20 may manage a website via the webserver 21 for providing medical services and to deliver web pages constituting the website in response to a request from client device 1 or the application software running on a mobile device of the user (e.g. client device 1) may provide substantially similar services. In other words, the patient may access server device 20 through the browser of client device 1 or additionally through a platform function (e.g. of the operating system) via application software.

Figure 2:
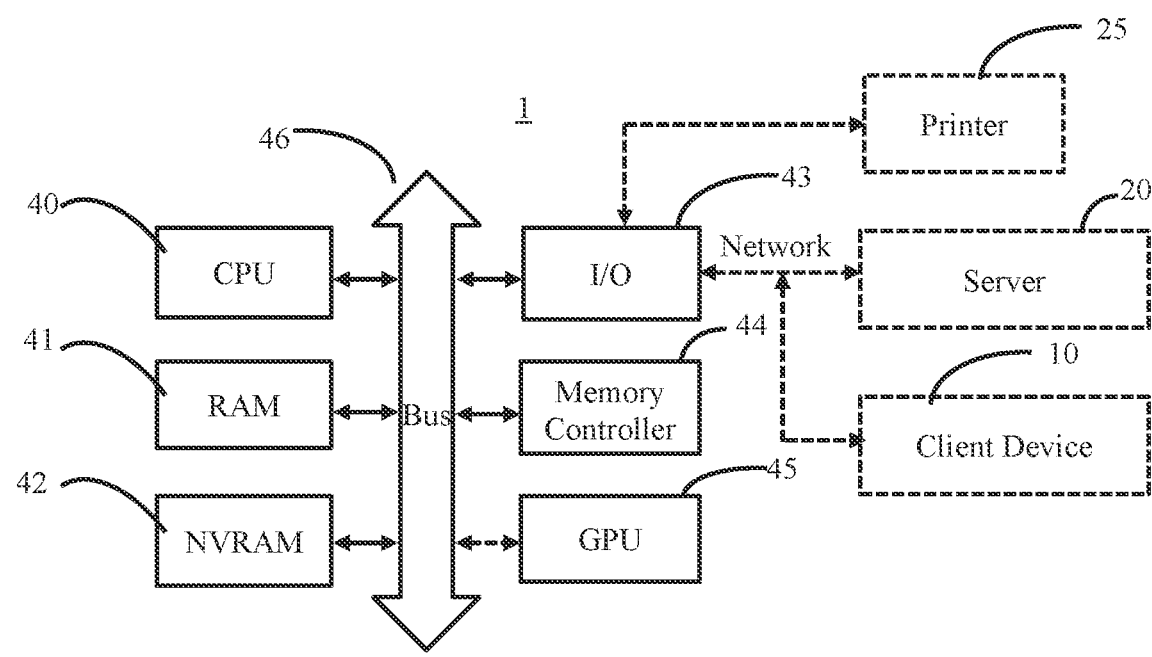
FIG. 2 is a block diagram illustrating the logical architecture of an exemplary client device, according to some embodiments.

Client device 1 (and 10) is shown in greater detail in FIG. 2, which is a block diagram illustrating the physical architecture of client device 1. Client device 1 may be, for example, a mobile phone, a smart phone, a personal computer (PC), a tablet PC, a personal digital assistant (PDA), a laptop computer, or an electronic book reader, but is not limited thereto. Client device 1 may include, for example, a central processing unit (CPU) 40 with one or more processors, a volatile random access memory (RAM) 41, a non-volatile RAM (NVRAM) 42, a memory controller 44, a graphics processing unit (GPU) 45, and a plurality of input/output (I/O) interfaces 43. These components may be electrically connected to one another via a bus 46. CPU 40 may load an operating system and various programs for controlling the login and navigation of client device 1 into the volatile memory 41 from the non-volatile memory 42, and may execute commands included in the loaded programs or apps.

In some implementations, client device 1 may be configured as a system that includes one or more units (e.g. a tangible, non-transitory medium), each of which is configured to carry out some aspects of the herein-described methods either in software, in hardware, or in some combination thereof. At least some values for the results of the method or computer instructions may be saved for use in a machine-readable medium, including memory units, and storage devices. Execution of the computer instructions by one or more processors effectuates operations of client device 1.

The volatile memory 41 of client device 1 may be used to store a program to be executed by CPU 40, and it may be formed of, for example, a dynamic random access memory (DRAM). The non-volatile memory 42 of client device 1 may be, for example, a solid state drive (e.g. flash) and/or a magnetic disk drive, and it may store various programs such as an operating system or a control program for enabling access to data on server 20 (or another client) by the client.

Another embodiment relates to an apparatus for carrying out the herein-described methods, where the apparatus includes a computer for executing machine-readable instructions related to the method. For example, the computer may include one or more processors for executing at least some of the instructions. Additionally or alternatively the computer may include circuitry or other specialized hardware for executing at least some of the instructions. When responding to an instruction for receiving a medical application from the server device 20 via the I/Os 43, the volatile memory 41 and/or non-volatile memory 42 of client device 1 may store the received application.

One or more I/Os 43 of client device 1 may be used for communication with the user (e.g. a patient) and for communication with other clients (e.g. a doctor) and the server 20 over the network 30. One or more I/Os 43 may be implemented as hardware, firmware, and/or communication software. For communicating with server 20 and other client devices (e.g. client device 10 over network 30), a transmission control protocol/Internet protocol (TCP/IP) driver may be implemented with Transport Layer Security (TLS). TLS may be used to protect communication between a server and a client or between two clients, including communication of encrypted data, whether initiated by the server or by a client. Server 20 may notify the user when data is available to be viewed. A link, for example, may be generated by server 20 and transmitted to the user via a short message service (SMS) or an email.

I/Os 43 for communicating with the user may include peripheral information input devices, for example, a touch pad, a touch screen, a keyboard, a button, or a mouse for accepting an input from a patient user, and an information output device such as a printer or a liquid crystal display (LCD) for outputting processed results of CPU 40. A printer, such as printer 25 of FIG. 2, may communicate with client device 1 through a wired or wireless network or through a direct connection, e.g., per the Universal Serial Bus (USB) standard. The printer may interoperate with software running on CPU 40 of client device 1 via software drivers.

The various operations of example methods described herein may be performed, at least partially, by CPU 40 of client device 1, which may be temporarily configured (e.g. by software) or permanently configured to perform the relevant operations. Whether temporarily or permanently configured, CPU 40 may constitute processor-implemented modules that operate to perform one or more operations or functions. At least some of the operations of the methods described herein may therefore be performed by one or processors or processor-implemented modules, according to some embodiments. For example, referring back to FIG. 1, client device 1 may be comprised of login control module 2, key derivation module 3, key generation module 4, and cryptography module 5.

The performance of certain of the operations may be distributed among the one or more processors of the CPU 40, not only residing within a single device, but deployed across a number of devices. In some example embodiments, the one or more processors of CPU 40 may be located in a single location, while in other embodiments the processors may be distributed across a number of locations.

In some embodiments, the methods described herein may be fully or partially hardware-implemented. For example, a hardware-implemented module may comprise dedicated circuitry or logic that is configured by firmware (e.g. as a special-purpose processor or as programmable logic/circuitry, such as a field programmable gate array (FPGA) or an application-specific integrated circuit (ASIC)) to perform certain or all cryptographic operations.

The processes and procedures described and illustrated herein may also be installed in the form of a computer program, and executed by various computers. Also, even if processes and procedures are described and illustrated herein to be executed by a single device, software piece, hardware component, or module, such processes and procedures may also be executed by a plurality of devices, software pieces, components, and/or modules. In sum, the processes and procedures described and illustrated herein, e.g. with regard to a key hierarchy structure (KHS), may be implemented by software, hardware, or any combination thereof including those explicitly stated in the embodiments. More specifically, the processes and procedures described and illustrated herein may be implemented by the installation of the logic corresponding to the processes into a medium such as an integrated circuit, a volatile memory, a non-volatile memory, a magnetic disk, or an optical storage.

Also, even if a data, table, or database (e.g. the KHS) are described and illustrated herein to be stored in a single memory, such data, table, or database may also be distributed to and stored in a plurality of memories included in a single device or a plurality of memories located in a plurality of devices in a distributed manner. Furthermore, the elements of the software and hardware elements described and illustrated herein may also be integrated into a smaller number of constituent elements or separated into a larger number of constituent elements. In other words, the data structures described herein may be distributed among multiple memory devices, and in some cases, among multiple memory address spaces defined by multiple operating systems on one or more computing devices.

Figure 3:
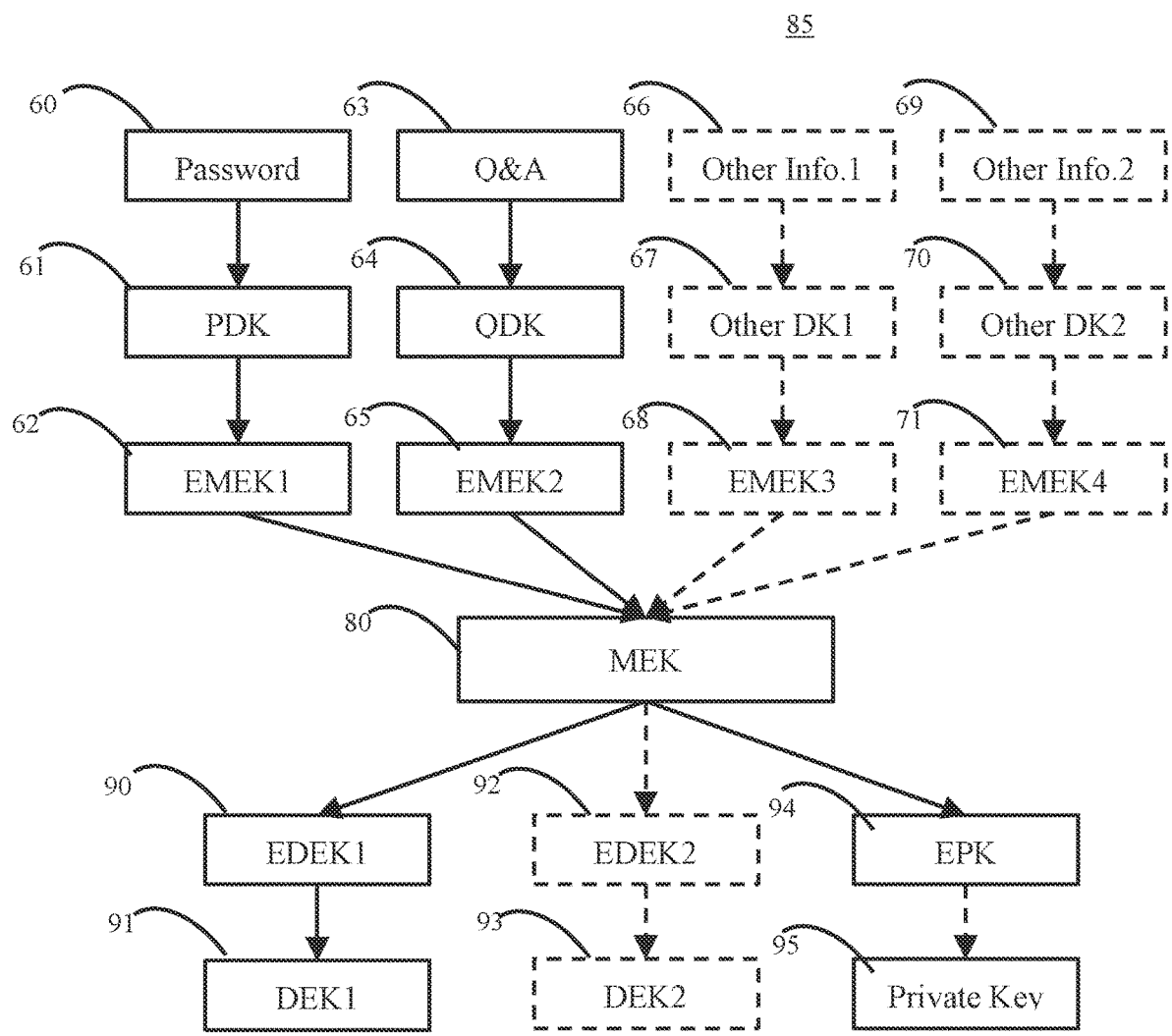
FIG. 3 is a block diagram of a data model for an exemplary key hierarchy structure, according to some embodiments.

The user may access server 20, which may be hosted on a cloud or anywhere else, by providing credentials, including a password 60 or answers to security questions 63, as is described with regard to FIG. 3. If such access is the first time for the user, the user may go through a registration procedure. Referring back to FIG. 1, the login procedure may be implemented by the login control module 2 of client device 1.

In some embodiments, new patients register by providing registration data, e.g., an email address, a phone number, a password, and answers to security questions. With the email address or a phone number provided, the user may go through a verification process using a test link or code, respectively. Once the email address or the phone number is verified the user is designated in memory as being registered.

In response to registration of a new patient (user), some embodiments may create a new key hierarchy structure (KHS) for that user. KHS 85, shown in the example of FIG. 3, may include a data encryption key (DEK) 91, a master encryption key (MEK) 80, a password-based derived key (PDK) 61, and a questions-based derived key (QDK) 64, and the KHS may be used for protecting against unauthorized access to the user data. The multi-key encryption afforded by KHS 85 may allow recovery in case of a single key loss. In some embodiments, some or all of the keys in KHS 85 may be symmetric keys.

KHS 85 may be used to protect user data. Security is enhanced in some embodiments by leaving exclusive control of the keys with the owner's computing device (e.g., the computing device of a user, patient, doctor, etc.) of the data. In some embodiments, only owners of their own data may view and share their own data, and the keys may reside exclusively on the client device in some cases. When stored or shared, the user data may be encrypted. That said, several independently useful inventions are described, and some of those other inventions may be used in other embodiments without also providing these benefits.

In some embodiments, a user of a mobile client device (e.g. client device 1) may access server 20 (hosted on the cloud or anywhere else) by downloading a software application (app) pertaining to operation of server 20 and information sought by the user. Alternatively, by responding to an SMS or email provided by the server 20, a user may access server 20 and navigate pages on the webserver 21 of server 20 without downloading the app.

A user may be a doctor or provider and another user may be a patient of the doctor. The doctor may generate data to send to the patient and then server 20 may send a link with a unique identifier, where the link directs the patient to information (e.g. instructions) for the patient. There may be no private information revealed in the link (e.g. not even the name of the doctor). The patient may click the link, but to gain access to the information the patient would have to first login to server 20. The link may be securely generated based on one or more random numbers, a hash of an original website address, a hash of the message, a shortened version of the original website address (e.g. as performed by bit.ly), or in any other suitable, secure fashion.

Figure 4:
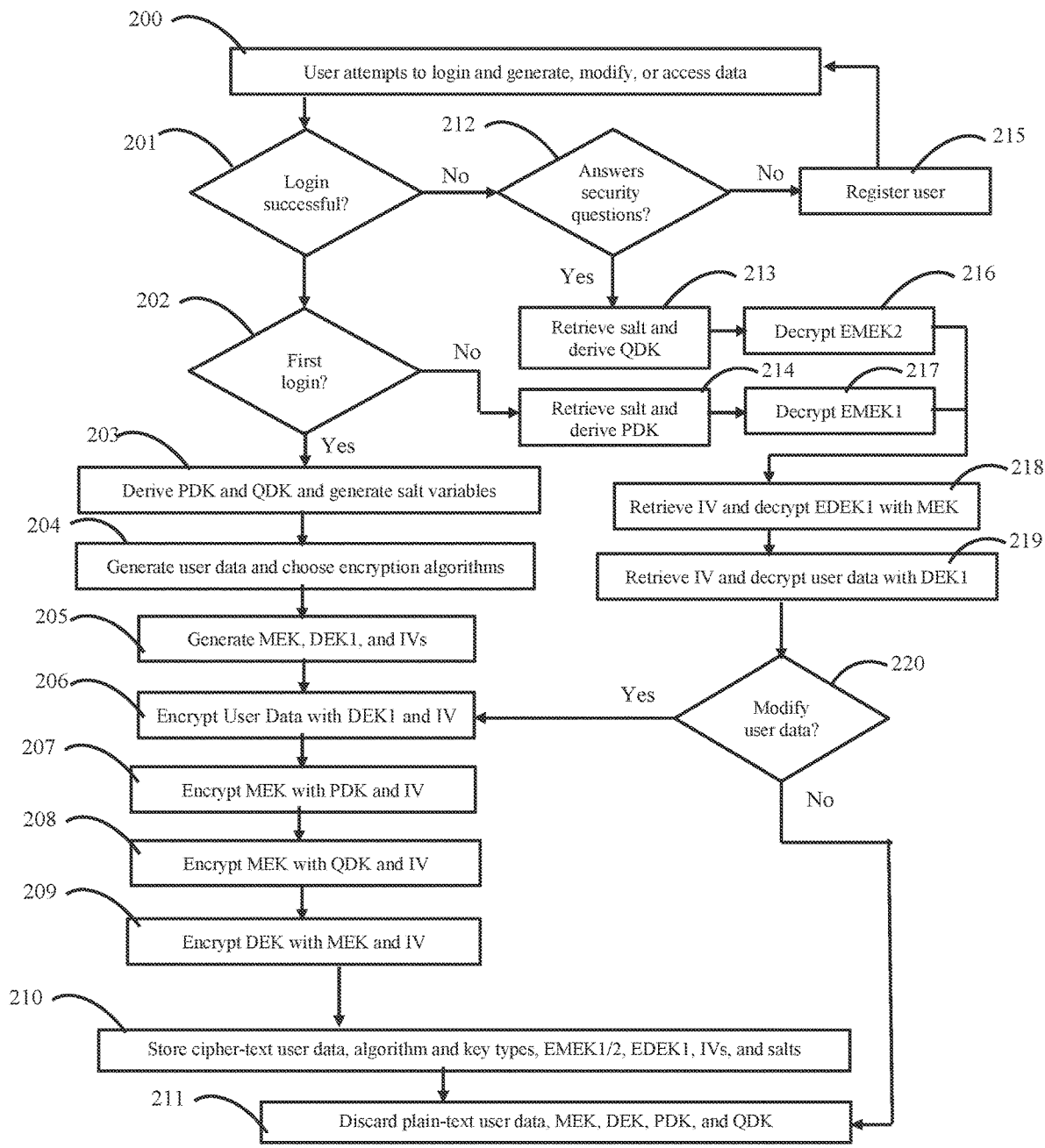
FIG. 4 is a flowchart of a process by which a client device may encrypt and decrypt user data and keys, according to some embodiments.

After logging in, the user may generate new user data to be encrypted or decrypt any existing user data belonging to the user (or shared with the user) that was previously encrypted simply to view or modify the user data. New user data may be generated, for example, by a doctor when creating a list of instructions, by a patient when asking questions about a procedure, or by a provider providing some treatment options under a particular insurance plan. Generated user data may be entirely new and created from a beginning or it may be based off a preexisting template that is tailored for a particular patient, for example. As such, process 200 in the flowchart of FIG. 4 may be performed. If the user, though, does not provide the proper password 60, determined at process 201 in the method of FIG. 4, the user is prompted to answer the same question(s) provided at registration. If the user does not provide proper answer(s) 63, determined at process 212, the user is prompted to go through the registration process 215. Had the user provided the proper password 60 then another process 202 is traversed to determine if the user had previously logged in. If the user had already logged in at least once then a previously stored salt variable is retrieved from a stored entry of KHS 85 and PDK 61 is re-derived 214. Had the user provided proper answers to the security questions 63 at process 212, then similarly, a different, previously stored salt variable is retrieved from a stored entry of KHS 85 and QDK 64 is re-derived 213. Ensuing processes shown in FIG. 4 will be discussed below but beforehand the assumption is that the user is logging in for the first time. The processes of the method of FIG. 4 are performed by client device 1 and in some instances by additionally interfacing with server device 20.

Derived keys (DKs), such as PDK 61 and QDK 64, may serve as an entry point into KHS 85. For example, knowing one of the DKs in its plain-text form serves as an entry into taking subsequent steps to decrypt and thus determine in plain-text the other keys in KHS 85. KHS 85 may be created with at least two DKs, e.g. with a PDK and a QDK. PDK 61 may be derived from a password 60 that is obtained from the user. QDK 64 may be derived from questions provided to (e.g. optionally selected by) the user along with the corresponding answers 63 provided by the user. The DKs are at a first level in KHS 85, as shown in FIG. 3. Below that is the master encryption key (MEK) 80 and below that are the data encryption keys (DEKs) and Private Key 95. By this segregation, with the DKs known, a user may venture to have access to MEK 80 (but not the DEKs). The DKs may change without affecting the DEKs.

Other information than a password 60 and answers to security questions 63 may be provided to derive keys. For example, other information 1 66 and/or other information 2 69 may be provided to derive other DK 1 67 and other DK 2 70, respectively, as shown in FIG. 3. The other information may be an email address, telephone number, or other personal information regarding a user of client device 1.

KHS 85 may contain a plurality of entries. The entries may be grouped into blocks, such as a DEK block and a MEK block. The entries may comprise fields for identifying certain aspects of an encryption step (e.g. the type of encryption) and include parameters needed for the encryption (e.g. random numbers). The names of entries of KHS 85 may be purposefully obfuscated to stymie those attempting to gain access to the encrypted keys. For example, the name of each entry within KHS 85 may be given an arbitrary name, such as refN, to represent it, where N is a number. The names, entries, and the KHS itself may be stored in non-volatile memory 42 of client device 1.

As shown in FIG. 1, the derived keys (DKs), e.g., PDK 61 and QDK 64, may be derived by the key derivation module 3 of client device 1. For example, PDK 61 may be derived using a Password-Based Key Derivation Function (PBKDF), such as PBKDF2, which is part of the Public-Key Cryptography Standard (PKCS). The client device may execute a pseudorandom function, such as a cryptographic hash, cipher, or hash message authentication code (HMAC) that takes as input password 60 along with a random salt value and repeats the process hundreds or thousands of times (e.g., 10,000 rounds). The salt variable may be generated by a CSPRNG and may be several bytes long (e.g., 32 bytes, 64 bytes, etc.). It may be stored as an entry of KHS 85, as shown in process 210. The computing device executing PBKDF2 may use the message-digest algorithm (MD5), secure hash algorithm I (SHA-I), SHA-2, SHA-3, or SHA-256. The outcome may be a derived key (DK), which may then be used as a cryptographic key for encrypting MEK 80. Such derivation constitutes partial completion of process 203, as shown in FIG. 4.

Key derivation module 3 may also derive QDK 64 by use of a key derivation function, such as PBKDF. Some embodiments for accomplishing this task may include concatenating the selected questions and given answers 63. For example, two questions and two answers may be used, but the present disclosure is not so limited. The questions and answers 63 may all be converted to upper case and the spaces between them may be removed. Continuing with the example of two questions and two answers, the first question and the first answer may be concatenated. The second question and the second answer may also be concatenated. The second question and the second answer may then be appended to the first question and first answer. Using a salt value generated by a CSPRNG, the hashing function may then be performed, e.g. using the HMAC SHA-256 algorithm. As when deriving PDK 61, several thousand rounds (e.g. 10,000) may be iterated to arrive at a resulting value. This value may be an input to the PBKDF2. The resulting QDK 64 may then be stored in volatile memory 41, e.g. separate from the block arrays of KHS 85. The salt used for generating QDK 64 may be stored as an entry of KHS 85, as shown in process 210. With the derivation of QDK 64, process 203 is complete.

Next, in process 204, a user may generate user data and choose all of the encryption algorithms to be used in the further determination of entries of KHS 85. In some embodiments, the encryption algorithms are predetermined. For example, in the DEK block of KHS 85, an entry may be used for storing the chosen (or predetermined) encryption algorithm type used for encrypting the DEK into the encrypted DEK (EDEK 90). Similarly, an entry in the DEK block may be used for identifying the key used for encrypting the DEK.

Different encryption algorithms and different types of keys may be used and stored within KHS 85. The algorithm type entry may be a first entry and the key type may be a second entry. For example, the DEK may be encrypted using the encryption algorithm type stored in the first entry of the DEK block of KHS 85. Similarly, the DEK may be encrypted using the chosen key, which may be referred to by accessing the second entry in the DEK block.

Referring again to FIG. 1, MEK 80 and DEK 91 may be generated by the key generation module 4 of client device 1. For example, MEK 80 may be generated based on a random number generator, and the DEK may be similarly generated. Generation of MEK 80 and DEK 91 partially completes process 205. MEK 80 and DEK 91 may each have any suitable length. For example, the bit-width of MEK 80 may be a fixed length, such as 16 bytes (128 bits) or 32 bytes (256 bits), and the length of DEK 91 may be a fixed length, such as sixteen bytes (128 bits) or thirty-two bytes (256 bits). In some embodiments the length of each may be dynamic (e.g., user configurable by a processor at the client device). The bit-width of MEK 80 may be determined by balancing the battery and thermal loads with the added security accrued by longer MEK lengths. In some embodiments, MEK 80 may have a bit-width larger than DEK 91, since encryption and decryption of a large data set with the DEK 91 could be costly in terms of CPU cycles. The bit width of the DEKs may therefore be of the same bit-width or smaller than the bit-width of MEK 80. For example, MEK 80 may be 256 bits wide, and DEK 91 may be 128 bits wide.

The DEK block of KHS 85 may also comprise specific information for using the encryption algorithm. For example, another entry in the DEK block of KHS 85, in some embodiments, may be a random initialization vector (IV) for encrypting DEK 91 and decrypting EDEK 90. In some embodiments, the IV may be represented in the base-64 encoding scheme. Another entry may be for an IV that is generated for encrypting the user data (and decrypting the encrypted user data) with the DEK.

Another entry in the DEK block of KHS 85 may be EDEK 90 itself In some embodiments, EDEK 90 may be stored in the base-64 encoding scheme. EDEK 90 itself may be stored in the DEK block of KHS 85, i.e. after DEK 91 is encrypted with MEK 80. The IV used with the DEK may be a third entry, the IV for encrypting and decrypting the user data may be a fourth entry, and EDEK 90 may be a fifth entry of the DEK block of KHS 85.

Similar to the DEK block, the MEK block of KHS 85 may comprise several entries. A first entry that may be stored in KHS 85 may specify the type of algorithm to be used to encrypt (and decrypt) MEK 80. A second entry may be used to identify a key type used with the selected algorithm. MEK 80 may be encrypted using a chosen (or predetermined) encryption algorithm, which may be referred to by accessing the first entry in the MEK block of KHS 85. Similarly, MEK 80 may be encrypted using the chosen (or predetermined) key, which may be referred to by accessing the second entry in the MEK block. In some embodiments, an IV may be generated and used for each encryption of the MEK (i.e., EMEK1 62, EMEK2 65, EMEK3 68, EMEK4 71, etc.). Note that the IV for encrypting MEK 80 and the IV for encrypting DEK 91 with MEK 80 may each be different than the IV for encrypting the user data with the DEK.

Generation of the IVs for encrypting the user data, MEK 80, and DEK 91, as has been disclosed, completes process 205. It is to be understood, though, that some encryption algorithms consistent with the present techniques do not require the creation of IVs and in those implementations the step of generating an IV may be omitted from the method of FIG. 4, which is not to suggest that any other feature may not also be omitted. Alternatively, additional variables may be used as part of implementing an encryption algorithm and thus its generation is anticipated and embodied herein. With DEK 91 and an IV generated for encrypting the user data, the user data may be encrypted to complete process 206.

A third entry of the MEK block within KHS 85 may be the salt variable, which was used cryptographically to hash the password 60 and to hash the questions and answers 63 provided by the user. The salt may be a random value for deriving PDK 61 and QDK 64. A fourth entry may be an IV for decrypting MEK 80. A fifth entry may be the encrypted MEK (EMEK), which in some embodiments may be stored using the base-64 encoding scheme. The EMEK itself may therefore be stored in the MEK block of KHS 85, e.g. both as EMEK1 62 using PDK 61 in one sub-entry of the fifth entry and as EMEK2 65 using QDK 64 in another sub-entry of the fifth entry. The number and order of the entries within either the MEK block or DEK block are not to be construed as limiting for any of the contents of the blocks that may be in different entries. For example, a fifth entry may be a second entry in some implementations.

PDK 61 and QDK 64 may be the keys for encrypting MEK 80 into an encrypted MEK 1 (EMEK1 62) and an encrypted MEK 2 (EMEK2 65), respectively. Encryption of MEK 80 with PDK 61 and an IV to arrive at EMEK1 62 completes process 207. Similarly, encryption of MEK 80 with QDK 64 and another (or same) IV to arrive at EMEK2 65 completes process 208. MEK 80 may therefore be encrypted at least twice, i.e. once with PDK 61 and at least a second time with QDK 64. EMEK1 62 may represent a key (a MEK) encrypted with PDK 61 and EMEK2 65 may represent the master encryption key encrypted with QDK 64. PDK 61 and QDK 64 may also be the keys for decrypting EMEK1 62 and EMEK2 65 back to MEK 80, as will be discussed below with reference to processes 216 and 217.

With MEK 80 known, DEK 91 may be encrypted to arrive at an encrypted DEK (EDEK 90). Similarly, with MEK 80, EDEK 90 may be decrypted back to DEK 91. Encryption of DEK 91 with MEK 80 and another IV to arrive at EDEK 90 (or EDEK1 90 when multiple DEKs are used in certain embodiments) completes process 209. MEK 80 may not be used for encrypting or decrypting the user data. DEK 91 may be used for encrypting the user data.

The cryptographic implementations, e.g., whether on an iOS, Android, or on the web, may be different as to the functions implemented at the operating system (OS) level. They may use different libraries for generating the derived keys and for the encryption steps, but the outcome and strength of encryption may be relatively similar. The cryptography module 5 of client device 1, as illustrated in FIG. 1, may perform all encryptions and decryptions described herein, in some embodiments.

MEK 80 and DEK 91, after being encrypted at client device 1, may both be stored in encrypted form at the client and thus may not be stored in non-volatile memory 42 unencrypted. All user data may be stored encrypted at server 20. The storage of the cipher-text (encrypted) user data, encryption algorithm types, encryption key types, EMEK1 62, EMEK2 65, EDEK1 90, and the IVs completes process 210. With the various entries of KHS 85 stored, the plaintext user data, MEK 80, DEK 91, PDK 61, and QDK 64 may all be discarded (e.g. erased from volatile memory 41) to enhance security.

The user data may at some future time be decrypted after the user provides the proper credentials (e.g. password 60 or answers to security questions 63, either of which must match that which was originally provided upon user registration) at login. The corresponding salt is then retrieved from entries of KHS 85. PDK 61 and QDK 64 are then derived from the credentials using the salt. For example, with the password 60 supplied from the user and after it is confirmed to be a correct password the salt from KHS 85 for PDK 61 may be retrieved from non-volatile memory 42. PDK 61 may then be derived using substantially the same steps as has been discussed for deriving PDK 61, completing process 214 of FIG. 4. If the password supplied were not correctly then QDK 64 may be re-derived by supplying the correct answers to the security questions 63, completing process 213.

After newly deriving PDK 61 (or QDK 64), the algorithm type for the MEK block, key type, the IV for MEK 80, and the EMEK1 62 (or EMEK2 65) may be retrieved from KHS 85, e.g., by retrieving the first, second, third, fourth, and fifth entries of the MEK block, respectively. EMEK1 62 or EMEK2 65 may then be decrypted with PDK 61 or QDK 64, respectively, to arrive at MEK 80, completing process 217 or process 216, respectively.

Next the algorithm type, key type, salt, IV, and EDEK 90 are retrieved from the first through fifth entries of the DEK block of KHS 85. Note that KHS 85 may have more than five entries for any key stored within it or less than five entries. Using the algorithm, IV, and MEK 80, EDEK 90 may then be decrypted to arrive at DEK 91, completing process 218. The encrypted user data received by client device 1 (e.g. from server device 20) may then be decrypted with DEK 91, completing process 219. The user data may then be analyzed and the various entries that are not stored in KHS 85 discarded, completing process 211, but if the user decides in process 220 to modify the user data then the data may be re-encrypted, repeating processes 206-211. Note that EPK 94 and its corresponding entries may similarly be retrieved from KHS 85 to decrypt EPK 94 and arrive at private key 95 for decrypting shared data encrypted with a public key.

In some embodiments, the user may re-encrypt the user data at client device 1 or encrypt new user data (e.g., after a doctor creating a new checklist for a patient) using the public key of an intended recipient. The intended recipient's public key may be retrieved from a global lookup directory (GLD), e.g., implemented in server 20. For instance, a client device may send a query with an identifier of a recipient to the server 20, and the server 20 may retrieve the corresponding public key from memory and send the responsive public key to the client device. The client device, in some cases, may then encrypt data with the public key, such that the data does not leave the client device in unencrypted form, and the encrypted data is accessible to an entity holding the corresponding private key. Examples of such asymmetric key techniques include Diffie-Hellman key exchange, the Digital Signature Standard, ElGamal, elliptic curve techniques, the RSA encryption algorithm, and the like. In some implementations, the public key may be associated with an email address or a phone number of the respective user on server 20. The re-encrypted user data or newly encrypted user data may therefore be shared by the user with one other user or service provider via a public key infrastructure (PKI). It should be noted that not all embodiments afford all of the advantages attributed to this embodiment.

Figure 5:
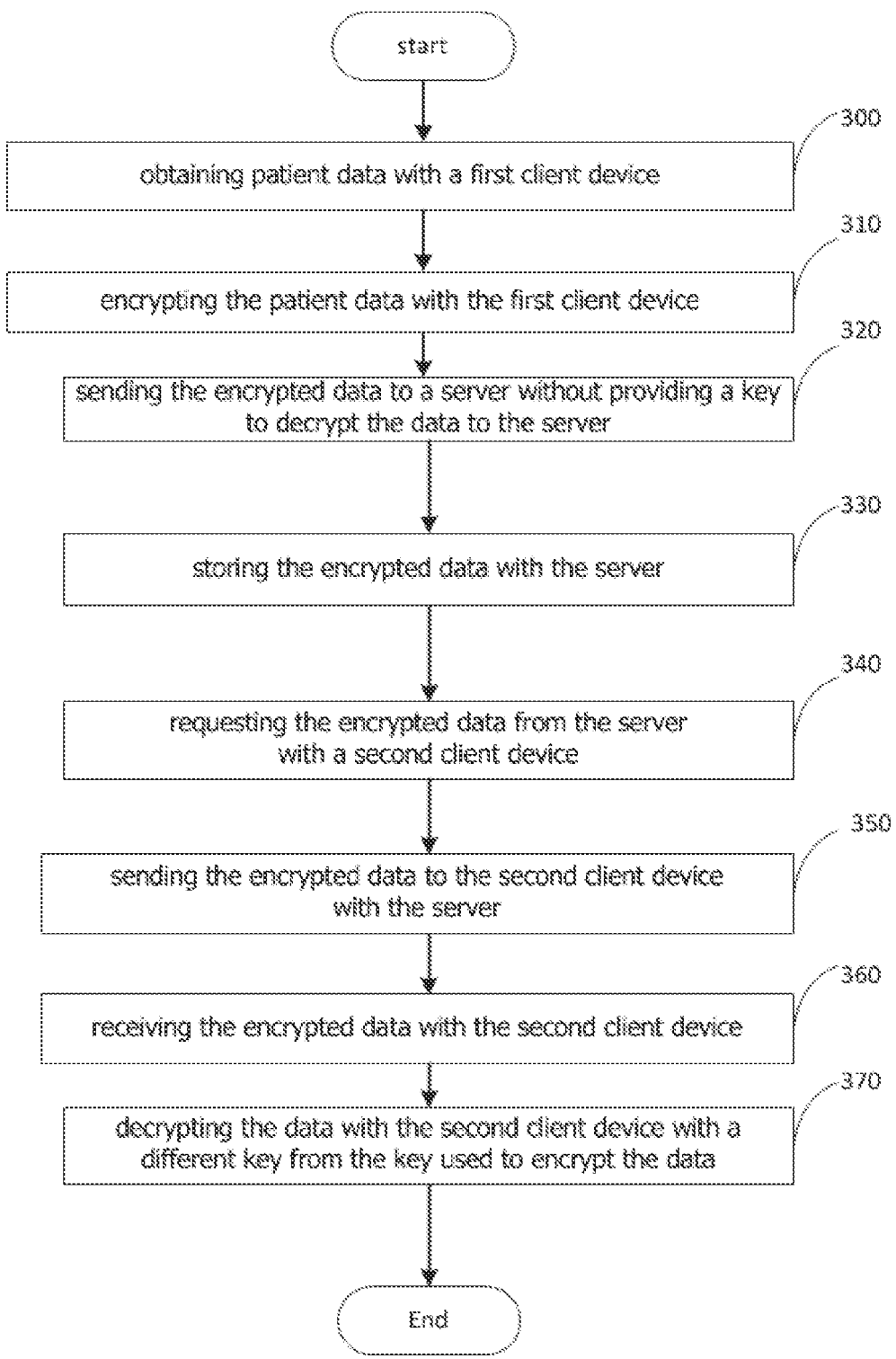
FIG. 5 is a flowchart of a process by which patient data can be securely shared between at least two client devices, according to some embodiments.

FIG. 5 is a flowchart of a process by which patient data can be securely shared between at least two client devices (e.g., a first and second client device or client devices 1 and 10). More particularly, the flowchart demonstrates application of secure sharing of data using an asymmetric-key encryption algorithm. In some embodiments, data is shared in encrypted form, without a key to decrypt the data being held by devices other than a recipient device. Some embodiments may securely share data in this fashion asynchronously, with the sent data held in encrypted form by a server 20 (that does not have a key to decrypt the data), before the data is later retrieved by a receiving client device, thereby affording relatively reliable and secure communication even when both the sender and receiver are lack concurrent network access. For example, the process, as shown in FIG. 5, in some embodiments, includes a first client device obtaining patient data, as shown in block 300, and the process may include the first client device encrypting the obtained patient data, e.g., with a public key of the recipient device retrieved from a server upon sending the server an identifier of the recipient, as shown in block 310. Next, in some embodiments of the process, a server (e.g., the same server) is sent encrypted data, but without also providing a key (to decrypt the data) and without the entity operating the server otherwise having access to such a key, as shown in block 320. In some embodiments, the process includes the server storing the encrypted data, e.g., for more than one minute, more than one hour, more than one day, or until the data is requested by the recipient device, as shown in block 330. Then, in some embodiments of the process, a second client device requests the encrypted data from the server, as shown in block 340. In some embodiments of the process, the server responds by sending the encrypted data to the second client device, as shown in block 350. In some embodiments, the second client device receives the encrypted data, as indicated by block 360. Next, in this example, the second client device decrypts the data with a different key from the key used to encrypt the data, such as a private key corresponding to the public key used by the sending device to encrypt the data, as indicated by block 370.

Client device 1 may participate in these embodiments of sharing data with another user or service provider. For example, for new users, a private/public key pair may first be generated on client device 1 when the new user registers. This step, e.g., may be tied-in with KHS 85 creation, as discussed above. Once existing users log in a new private/public key pair may similarly be generated but instead of regenerating all of KHS 85 only the new private key 95 may be generated and then encrypted with the MEK to be stored in KHS 85 as EPK 94. EPK 94 may be stored in KHS 85 at a same level as the DEKs. For security purposes, private key 95 may not be sent from client device 1 unencrypted, and private key 95 may not be stored on client device 1 unencrypted. The private/public key pairs may also expire (e.g., in 30 days) such that new ones may be generated thereafter. Expired private keys may be stored within KHS 85 or within server 20 as key history. In some cases, private keys reside exclusively on client devices.

After user data is encrypted with a public key the encrypted user data may be sent to server 20 and stored on server 20 in encrypted form. The intended recipient (e.g., another user) may then be notified. When this other user then logs into server 20 (e.g., by logging in with the app) the shared data (in encrypted form) may be pulled from server 20, in some cases, without the server ever having access to the data or the keys by which the data can be decrypted. This other user's private key may then be retrieved from the KHS pertaining to this other user by decrypting the corresponding EPK. The shared data may then be decrypted with this other user's private key, e.g., by the recipient client device.

In some embodiments, the user may re-encrypt any decrypted user data or encrypt new user data (e.g., after creating a new checklist) at client device 1 using a shared DEK (SDEK), which is part of another KHS (e.g., a shared data KHS (SD-KHS)). The SDEK and an SD-KHS (or another key format and security architecture) may be used when users intend to share the reencrypted user data or newly encrypted user data with a plurality of intended recipients, e.g., with more than one other users and/or with service providers. It should be noted that not all embodiments afford all of the advantages attributed to this embodiment.

SDEKs of an SD-KHS may be used for sharing data with multiple users because the user data in the embodiments provided herein are stored encrypted and only a user's credentials can lead to the decryption of user data; encrypted data therefore cannot be shared as it is. PKI allows secure sharing between a pair of users but is not feasible when a user (e.g., a patient) desires to share user data with a group of other users who can then collaboratively view and work on the shared data (e.g., if a patient needs to share data with their doctor's dashboard). The doctor's collaborators may comprise one or more users who are monitoring a patient's progress and who may like to request updates. A patient may therefore share user data belonging to the patient, e.g., to ensure compliance with guidance from the doctor. The communication may be protected using another KHS, the shared data KHS (SD-KHS).

In some embodiments, whenever user data (e.g., created by a user or a service provider) is to be shared with a group of other users, a shared copy of the user data may be created. For a shared copy of user data a new shared data-key hierarchy system (SD-KHS) may be generated. Each SD-KHS may contain a plurality of SDEKs in encrypted fashion, i.e., encrypted as share data encryption keys (ESDEKs). Copies of the user data to be shared may be encrypted using an SDEK. For each user with whom data is to be shared, their public key may be retrieved from the GLD and the SDEK may be encrypted with the retrieved public key to arrive at the ESDEK. While the SDEK may not be stored in non-volatile memory, the ESDEK may be stored in non-volatile memory. Each ESDEK may be stored as a different entry of the SD-KHS.

The SD-KHS may then be attached to the encrypted user data, which is to be shared, and together sent from the client device for storage in a cloud (e.g., as part of a system pertaining to server 20). Upon receipt of requests for access to this encrypted data, server 20 may provide the requesting users with the requested data (in encrypted form) and the SD-KHS, which pertains to the requested data and includes one or more respective ESDEKs. In some embodiments, the SD-KHS is an entirely different structure than KHS 85.

The requestor's client device may then decrypt the ESDEK included in the SD-KHS using the private key from KHS 85 belonging to the requesting user. The requestor's client device may then use the SDEK to decrypt the shared data. At this point, the requestor's client device may edit the decrypted shared data (which may be a shared copy of the original user data). In some embodiments, after editing, the client device pertaining to the requestor may encrypt a notification message using the public key of the owner of the original user data and send the message. The owner of the user data (or more precisely, their client device) may then decrypt the message with the private key of the owner obtained from the KHS pertaining to the owner. The owner may then accept or reject the edit(s). If accepted, the change will be incorporated into and saved to the secure, original copy of the owner. A new shared data copy may then be created and encrypted using the SDEK. The other users who are in a shared group may then be notified of the change. The present embodiments therefore resolve the problem of sharing data with multiple users who have authorization (e.g., by virtue of being in the shared group or list) to modify the data.

In some embodiments, one or more users in a shared group (i.e., users with an ESDEK stored in an SD-KHS and thus implicitly authorized to access the shared user data) may be deleted from the shared group or list. In these implementations, the client device of the owner of the user data may replace the local copy of the shared data with a new copy for sharing. The SDKHS may then be re-initialized, by, e.g., creating a new SDEK and encrypting new ESDEKs for each of the users in the new, smaller group of shared users. As before, the SD-KHS may be attached to the new, encrypted copy of the user data and stored at server 20 (or in a cloud). The still active users in the shared group may then be notified of this event.

An entry point to the SD-KHS may be at least through the owner of the shared data, more specifically via the public/private key pair pertaining to the owner. In some embodiments, the SD-KHS may be initially created by encrypting the SDEK with the owner's public key. In implementations providing for the sharing of data publically, the SDEK may be encrypted with a server's public key. For more private sharing, the SDEK may be encrypted with only the public key of the users in a shared list or group. Some embodiments may provide for public sharing along with sharing with users in the shared list or group. In these implementations, the encrypted SDEK for all of the intended recipients of the shared data may be stored in the SD-KHS, but not all of the ESDEKs stored in the SD-KHS need to be necessarily included in the instance of the SD-KHS that is attached to the encrypted shared data when sharing. Each user in the shared group may therefore receive a different SD-KHS after requesting access to the shared data.

Similar to the implementation of KHS 85, the SD-KHS may contain various entries. These entries may include a version string, an array of ESDEKs, a user identification of the user to whom the ESDEK belongs, a key type label, a reference to an encryption algorithm to be used for encrypting the SDEK (or the user data), and other specific information for implementing the encryption (e.g., an initialization vector). Each of the entries when stored in the SD-KHS may have obfuscated names for increased security. The SDEK may be randomly (e.g., pseudo-randomly) generated in a similar fashion to the generation of the DEK, mentioned above.

In some other embodiments, implementing a different manner of user data sharing, client device I via the I/Os 43 may additionally include a printer driver, such as a printer driver capable of interfacing with the network. In some of these embodiments, a printer driver may be installed on the client device 1. A user printing a document to a printer (e.g., to printer 25 of FIG. 2) may be prompted, via operation of the printer driver, with an option to securely send the user data, which is being printed (e.g., practically simultaneously, like within two minutes, or less than ten seconds), to another client device (e.g., client device I 0). In some embodiments, a processor of the printer may execute routines asynchronously relative to the processor of the client device 1, and the driver may interface between the OS of the client device and the printer, e.g., by issuing or handling interrupts. In some embodiments, the driver may transfer data from memory of the client device I to a buffer of a printer and instruct the printer to print a document described by the data. The user may take the option to initiate communication of the user data when or instead of printing, and the driver may receive this input and take responsive action.

The user data, in some of these embodiments, may therefore be shared by first notifying (e.g., securely) another user via a communication medium, e.g., an SMS message or email. The client device of the other user may receive the notification that the respective user has received a secure message, which may include a secure link to view contents (e.g., the original user data that was printed) stored in server 20. The other user may then log-in to server 20 (or register for a new account as described above). Once logged-in, the client device of the other user may then be able to display contents of (after decryption) the shared data whose communication was initiated by the printer driver. These embodiments therefore support the ability to access user data destined for a printer such that it is securely delivered to another user upon notification and using the herein described security features.

In some embodiments, user data may be sent using the printer driver of client device 1 in a fashion that is trackable (e.g., on a dashboard or platform for user interaction operated by server 20). The tracked communication of user data may show when and to whom the data was sent, when the message was received, and when viewed by the other user.

Returning to the discussion of KHS 85, the encrypted user data may be stored separately from EDEK 90 and the EMEKs. For example, the encrypted user data may be stored at server 20, and EDEK 90 and the EMEKs may be stored in memory device 42 of client device 1. Client device 1 may discard the credentials information (e.g. password 60 and answers to questions 63) provided by the user for deriving PDK 61 and/or QDK 64 after PDK 61 and QDK 64 are derived. Client device 1 may also discard the DKs (e.g. PDK 61 and/or QDK 64), MEK 80, and DEK 91 after the user data is encrypted or decrypted. The keys are therefore not stored in plaintext form in non-volatile memory 42, adding a layer of security.

In some embodiments, all entries of each KHS block (e.g., each of the algorithm type, key type, IV, salt, etc.) may be stored in non-volatile RAM 42 of client device 1. In other embodiments, one or more of the entries of the KHS blocks may be stored only in volatile memory 41 or in some combination. MEK 80 and DEK 91 itself may not be stored in nonvolatile memory 42. MEK 80 and DEK 91 may in some embodiments be stored temporarily in volatile memory 41 for encrypting the DEK (or decrypting EDEK 90) and encrypting user data (or decrypting encrypted user data), respectively. Upon encrypting DEK 91 or decrypting EDEK 90, MEK 80 may be removed from volatile memory 41. Upon encrypting (or decrypting) the user data, the DEK may be removed from volatile memory 41.

In some embodiments, MEK 80 and DEK 91 are generated upon registration of the user, which may be concurrent upon creation of KHS 85. The generation of MEK 80 and DEK 91 and also the salt variables and the IVs may comprise use of a random number generator, e.g. a cryptographically secure pseudo-random number generator (CSPRNG). The bit-width of MEK 80, DEK 91, the salts, and the IVs for the encryption processes may be the same or different, and they may be generated using the same random number generation scheme or different. The salt used for deriving PDK 61 and the salt used for deriving QDK 64 may be determined by CPU 40 of client device 1, depending on a utilized platform (e.g. iOS, Android™ OS, or on the web). Similarly, MEK 80, DEK 91, and the IVs may be generated by CPU 40 and, uniquely, depending on the different platform utilized.

In some embodiments, the entries of the MEK and DEK blocks in KHS 85 used in the encryption and/or decryption of MEK 80 and DEK 91, except for the EMEK and EDEK entries, may be predetermined prior to encrypting or decrypting. For example, the first and second entries may be predetermined upon installing an application at client device 1 that uses KHS 85 or upon registration of the user at server 20 or at any time prior to an encryption or decryption. The third and fourth entries may be generated at any time, such as at a time just prior to an encryption or decryption.

KHS 85 may be stored in various data-interchange formats, such as a serialized data format. The file format for storing KHS 85 may be, e.g. JavaScript Object Notation (JSON), Extensible Markup Language (XML), etc. A KHS may be differentiated by its version number to allow for backwards compatibility with earlier versions. KHS 85's version name may be obfuscated along with the obfuscation of the names of the other entries in each block of KHS 85.

A public key may be generated by server 20, and a corresponding private key (e.g. private key 95) may be generated for storage in encrypted fashion within KHS 85 of client device 1. Private key 95 may be generated using a CSPRNG, in some embodiments. The private and public keys may each have any suitable length. For example, the length of private key 95 may be a fixed length, such as 16 bytes (128 bits) or even as large as 2048 bits (or larger), and the length of the public key may be a fixed length, such as 16 bytes (128 bits) or even as large as 2048 bits (or larger). The public key may be stored in a global lookup directory at server 20. A set of entries (e.g. a key type, algorithm type, IV) may be generated and stored in KHS 85 for private key 95, similar to the creation and storage of entries for DEK 91. Private key 95 may form part of the DEK block of KHS 85.

Private key 95 may be encrypted using the chosen (or predetermined) encryption algorithm (e.g. advanced encryption standard (AES)-256 with cyber block chaining (CBC)), which may be referred to by accessing the first entry in the private key portion of the DEK block of KHS 85. Similarly, private key 95 may be encrypted using the chosen (or predetermined) key, which may be referred to by accessing the second entry in the private key portion of the DEK block of KHS 85. Private key 95 may be encrypted using a randomly generated IV, which may be stored in KHS 85. The encrypted private key (EPK 94) may be stored in another entry of KHS 85.

An encryption algorithm for encrypting a key of KHS 85 or user data may be the AES-256-CBC algorithm. The encryption algorithm for encrypting DEK 91, MEK 80, private key 95, and the user data may each be the same or different. The algorithm type may be stored in KHS 85 as an individual entry, as previously discussed.

Only a single DEK (i.e. DEK1 of FIG. 3) has been discussed, but in some implementations multiple DEKs (e.g. DEK2 93, when encrypted resulting in EDEK2 92) may be used to encrypt different pieces of user data to further segregate the risk that unauthorized access to one DEK would compromise all of the data for that user. For example, a different DEK could each be used for encrypting or decrypting answers to a patient's security questions, story (e.g., illness info and profile of the patient), medical data for the sake of learning about a malady, data for preparing for medical procedures, and data from the doctor to engage the patient (e.g. checklists). In other words, multiple types of data can be encrypted with multiple keys by use of KHS 85. In other embodiments, the different pieces of information may be encrypted and stored with the same key. For user data that is to be shared private key 95 different from DEK1 91 or DEK2 93 may be used for encrypting the user data.

Data stored on server 20 may be refreshed to client device 1. This may be done periodically by server 20 implementing a polling technique, i.e. a push of the data on server 20 to client device 1. Alternatively, the data stored on server 20 can be updated on client device 1 by request of the client via a pull technique, i.e. a pull of the data from server 20 to client device 1. Implied in either the push technique or the poll technique is that the client remains logged in to server 20 and thus the credentials for supplying PDK 61 or QDK 64 are already provided in KHS 85 for sequentially decrypting MEK 80 and DEK 91 before re-encrypting with the public key assigned to client device 1.

PDK 61 may be replaced if users would like to change their password 60 or if they have forgotten their password. This may be accomplished by verifying the answers to the security questions 63 given when generating QDK 64. Using the verified answers (and the questions) and the salt entry corresponding to EMEK2 65 in KHS 85, QDK 64 may be re-derived. With QDK 64 newly derived, the IV corresponding to EMEK2 65 and EMEK2 65 itself may be retrieved for decrypting EMEK2 65 and arriving at MEK 80. All of the entries corresponding to EMEK1 62 in KHS 85 may then be removed. With a new password 60 supplied by the user, PDK 61 may be re-generated using substantially the same process as when PDK 61 was originally generated. A new EMEK1 62 may be generated in substantially the same way as EMEK1 62 was originally generated and then stored as an entry of KHS 85.

QDK 64 may be replaced if users would like to change answers to their security questions 63 or if they have forgotten their answers. This may be accomplished by verifying password 60 given when generating PDK 61. PDK 61 may then be re-generated using verified password 60 and the salt entry from the corresponding entry for EMEK1 62 in KHS 85. The IV entry from the EMEK1 portion of KHS 85 and the EMEK1 itself may be retrieved for decrypting EMEK1 62 and arriving at MEK 80. Various values not stored in KHS 85 corresponding to the decryption of EMEK1 62 may then be removed from memory. With new answers to the selected questions supplied by the user, QDK 64 may be re-generated using substantially the same process as when QDK 64 was originally generated. A new EMEK2 65 may be generated in substantially the same way as when EMEK2 65 was originally generated and then stored as an entry of KHS 85.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. As used herein, the term "made available to" signifies communication between computing devices in a form that affords access to unencrypted data or access to the plain-text content of encrypted data (e.g. by decrypting the encrypted data with a key). The term "provided to" signifies data communicated between computing devices in encrypted form (e.g. where the receiving device does not have the key for decryption).

A random number generation, herein, encompasses random or pseudorandom number generation. For example, when referring herein to a random number, the random number may be a pseudorandom number generated by a cryptographically secure pseudo-random number generator (CSPRNG).

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. It will be understood that, although the terms first, second, third etc. may be used herein to describe various elements, these elements should not be limited by these terms. These terms are used to distinguish one element from another. Thus, a first element discussed below could be termed a second element without departing from the teachings of the present disclosure. It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Thus, disclosed is a process that may include deriving a key based on private credentials, receiving encrypted user data from a device over a network, decrypting an encrypted master encryption key with the derived key to make available a master encryption key (MEK) that encrypts data encryption keys, decrypting an encrypted data encryption key (EDEK) with the MEK to make available a data encryption key (DEK) that encrypts user data, and decrypting the encrypted user data with the DEK. Data may be encrypted with a shared DEK (SDEK) that is encrypted using a public key of a target user for sharing with the target user and that is stored with the encrypted data. The target user's private key may also be encrypted using another MEK and stored along with a DEK. The target user receiving the shared, encrypted data may decrypt an encrypted private key, which is paired with the target user and the public key, using the other MEK and may decrypt the encrypted SDEK (ESDEK) with the private key. The SDEK may be used to decrypt the shared data, each SDEK being related to a target user with whom the data is shared and generated as updates are made to the data.

The present techniques will be better understood with reference to the following enumerated embodiments:

1. A method, comprising: obtaining, by one or more processors of a first client device, a private key for a first user of the first client device that is paired to a public key for the first user of the first client device; receiving, by one or more processors of the first client device, encrypted user data over a network, the encrypted user data having been created by a second user of a second client device; receiving, by one or more processors of the first client device, a shared data key hierarchy structure (SD-KHS) over the network, the SD-KHS comprising one or more encrypted shared data encryption keys (decrypting, by one or more processors of the first client device, an ESDEK with the private key to make available a shared data encryption key (SDEK); and decrypting, by one or more processors of the first client device, the encrypted user data with the SDEK to make available the user data.
2. The method of embodiment 1, further comprising: editing, by one or more processors of the first client device, one or more elements of the user data; encrypting, by one or more processors of the first client device, a notification message using a public key for the second user of the second user device, wherein the notification message comprises an indication of the user data having been edited to at least the second user of the second user device; sending, by one or more processors of the first client device, the notification message over the network.
3. The method of any of embodiments 1-2, wherein the private key is obtained by decrypting an encrypted private key (EPK) that was stored as part of a key hierarchy structure (KHS).
4. The method of any of embodiments 1-3, wherein the SDEK is encrypted with the public key of the first user of the first user device by the second user device.
5. The method of any of embodiments 1-4, wherein the SDEK is not stored in a non-volatile memory.
6. The method of any of embodiments 1-5, wherein each of the ESDEKs is stored as a different array or set of arrays of the SD-KHS.
7. The method of any of embodiments 1-6, wherein the second user is a service provider.
8. The method of any of embodiments 1-7, wherein when the user data created by the second user is to be shared with at least the first user a shared copy of the user data is created.
9. A method, comprising: deriving, by the one or more client-side processors, a derived key (DK) based on information provided by a user of a client device without the information or the DK being made available to other parties; receiving, by the one or more client-side processors, encrypted user data sent from a server over a network, the encrypted user data having been created by the user of the client device; decrypting, by the one or more client-side processors, an encrypted master encryption key (EMEK) with the DK to make available a master encryption key (MEK), wherein the MEK serves to encrypt data encryption keys; decrypting, by the one or more client-side processors, an encrypted data encryption key (EDEK) with the MEK to make available a data encryption key (DEK), wherein the DEK serves to encrypt user data; and decrypting, by the one or more client-side processors, the encrypted user data with the DEK.
10. The method of embodiment 9, wherein the EMEK and the EDEK had been stored in a key hierarchy structure (KHS).
11. The method of embodiment 10, wherein the information provided by the user, the DK, the MEK, and the DEK are not stored in non-volatile memory before or after the information is provided.
12. The method of any of embodiments 9-11, wherein names of entries of the KHS are obfuscated.
13. The method of any of embodiments 9-12, further comprising: decrypting, by the one or more client-side processors, another encrypted data encryption key with the MEK to make available a private key, the private key being paired to a public key stored in a lookup directory of the server device; receiving, by the one or more client-side processors, encrypted shared user data sent from the server device over the network, the encrypted shared user data having been created by another user of another client device; receiving, by the one or more client-side processors, a shared data key hierarchy structure sent from the server device over the network, the shared data key hierarchy structure comprising one or more encrypted shared data encryption keys (ESDEKs) and having been created for the another client device; decrypting, by the one or more client-side processors, an ESDEK with the private key to make available a shared data encryption key (SDEK); and decrypting, by the one or more client-side processors, the encrypted shared user data with the SDEK.

The method of any of embodiments 9-12, comprising sending a message by performing operations comprising: receiving, with a printer driver of the client device, a request to print content; presenting, with the printer driver, a user interface including an input to indicate that at least some of the printed content is to be conveyed to another computing device of another user; receiving, a user input via the user interface, requesting content to be conveyed to another computing device; causing, with the printer driver, the content to be encrypted with an encryption key accessible via a private key of a user of the other computing device; and causing, with the printer driver, the encrypted content to be sent to a server from which the other computing device is to retrieve the encrypted content, wherein the server does not have access to a key to decrypt the encrypted content 14. The method of embodiment 9, comprising: requesting, by a server-side processor, a password from the user; and receiving, by the server-side processor, the password from the user, wherein the information provided by the user comprises the password such that the DK is a password derived key (PDK).

15. The method of embodiment 14, comprising: generating, by the one or more client-side processors, a random salt variable; hashing, by the one or more client-side processors, the password; and repetitively applying a pseudorandom function, by the one or more client-side processors, to the hashed password and the random salt variable.

16. The method of embodiment 15, comprising: concatenating, by the one or more client-side processors, the one or more answers and the one or more security questions; generating, by the one or more client-side processors, a random salt variable; hashing, by the one or more client-side processors, the concatenation; and passing, by the one or more client-side processors, the hashed concatenation and the random salt variable through a Password-Based Key Derivation Function (PBKDF).

17. The method of embodiment 9, comprising: requesting, by a server-side processor, one or more answers to one or more security questions from the user; receiving, by the server-side processor, the one or more answers to the one or more security questions from the user, wherein the information provided by the user comprises the one or more answers to the one or more security questions such that the DK is a questions-based derived key (QDK).

18. The method of embodiment 9, wherein two or more of the encryption of the user data, encryption of the DEK, and encryption of the MEK are performed with means for encrypting data.

19. The method of any of embodiments 1-19, wherein each of the encryption of the user data, encryption of the DEK, and encryption of the MEK is performed with a different algorithm.

20. A tangible, non-transitory, machine-readable media storing instructions that when executed by a client computing device in a zero knowledge messaging system effectuate operations comprising: deriving, by the one or more client-side processors, a derived key (DK) based on information provided by a user of the client device without the information or the DK being made available to other parties; receiving, by the one or more client-side processors, encrypted user data sent from another device over a network; decrypting, by the one or more client-side processors, an encrypted master encryption key (EMEK) with the DK to make available a master encryption key (MEK), wherein the MEK serves to encrypt data encryption keys; decrypting, by the one or more client-side processors, an encrypted data encryption key (EDEK) with the MEK to make available a data encryption key (DEK), wherein the DEK serves to encrypt user data; and decrypting, by the one or more client-side processors, the encrypted user data with the DEK.

21. The media of embodiment 20, wherein the EMEK and the EDEK had been stored in a key hierarchy structure (KHS).

22. The media of embodiment 21, wherein the information provided by the user, the DK, the MEK, and the DEK are not stored in non-volatile memory before or after the information is provided.

23. The media of any of embodiments 20-22, the operations comprising: requesting, by a server-side processor, a password from the user; and receiving, by the server-side processor, the password from the user, wherein the information provided by the user comprises the password such that the DK is a password derived key (PDK).

24. The media of embodiment 23, the operations comprising: generating, by the one or more client-side processors, a random salt variable; hashing, by the one or more client-side processors, the password; and repetitively applying a pseudorandom function, by the one or more client-side processors, to the hashed password and the random salt variable.

25. The media of embodiment 24, the operations comprising: concatenating, by the one or more client-side processors, the one or more answers and the one or more security questions; generating, by the one or more client-side processors, a random salt variable; hashing, by the one or more client-side processors, the concatenation; and passing, by the one or more client-side processors, the hashed concatenation and the random salt variable through a Password-Based Key Derivation Function (PBKDF).

26. The media of any of embodiments 20-25, the operations comprising: requesting, by a server-side processor, one or more answers to one or more security questions from the user; receiving, by the server-side processor, the one or more answers to the one or more security questions from the user, wherein the information provided by the user comprises the one or more answers to the one or more security questions such that the DK is a questions-based derived key (QDK).

27. The media of any of embodiments 20-26, wherein two or more of the encryption of the user data, encryption of the DEK, and encryption of the MEK are performed with means for encrypting data.

28. The media of any of embodiments 20-26, wherein each of the encryption of the user data, encryption of the DEK, and encryption of the MEK is performed with a different algorithm.

29. A tangible, non-transitory, machine-readable media storing instructions that when executed by a computing device effectuate operations comprising: the operations of any of embodiments 1-19.

30. A method, comprising the operations of any of embodiments 20-28.

31. A system, comprising: one or more processors; and memory storing instructions that when executed by at least some of the processors effectuate operations comprising: the operations of any of embodiments 1-28.

What is claimed is:

1. A system for communicating patient data, the system comprising:
 a first computing device associated with a patient, said first computing device configured to obtain patient data and encrypt the patient data with a first key, wherein the first computing device is further configured to transmit the encrypted patient data without providing the first key; and a second computing device associated with a care provider, said second computing device configured to request the obtained patient data over a network from a third computing system, said third computing system does not have a decryption key to decrypt the encrypted patient data, wherein the second computing device is further configured to decrypt the encrypted data with a second key that is different than the first key and wherein the second key is a private key obtained by decrypting an encrypted private key (EPK) that was stored as part of a key hierarchy structure (KHS).

2. The system of claim 1, wherein the first key is a public key.

3. The system of claim 1, wherein the first and the second keys are generated at a time of registration of the patient as a new user.

4. The system of claim 1, wherein another KHS is created based on a request to generate shared data.

5. The system of claim 1, wherein names of entries of the KHS are obfuscated.

6. A system for communicating patient data, the system comprising a computing system configured to:
receive, over a network, encrypted patient data associated with a patient, said patient data encrypted with a first key, wherein the encrypted patient data is received without the first key;
store the encrypted patient data without access to any decryption keys to decrypt the encrypted patient data; and
transmit the encrypted patient data based on a request for stored patient data, wherein the encrypted patient data is decrypted with a second key that is different than the first key and wherein the second key is a private key obtained by decrypting an encrypted private key (EPK) that was stored as part of a key hierarchy structure (KHS).

7. The system of claim 6, wherein the first key is a public key.

8. The system of claim 6, wherein the first and the second keys are generated at a time of registration of the patient as a new user.

9. The system of claim 6, wherein another KHS is created based on a request to generate shared data.

10. The system of claim 6, wherein names of entries of the KHS are obfuscated.

11. A method for communicating patient data, the method comprising:
receiving, over a network, encrypted patient data associated with a patient, said patient data encrypted with a first key, wherein the encrypted patient data is received without the first key;
storing the encrypted patient data without access to any decryption keys to decrypt the encrypted patient data; and
transmitting the encrypted patient data based on a request for stored patient data, wherein the encrypted patient data is decrypted with a second key that is different than the first key and wherein the second key is a private key obtained by decrypting an encrypted private key (EPK) that was stored as part of a key hierarchy structure (KHS).

12. The method of claim 11, wherein the first key is a public key.

13. The method of claim 11, wherein the first and the second keys are generated at a time of registration of the patient as a new user.

14. The method of claim 11, wherein another KHS is created based on a request to generate shared data.

15. The method of claim 11, wherein names of entries of the KHS are obfuscated.

* * * * *